US011142623B2

(12) United States Patent
Krick et al.

(10) Patent No.: US 11,142,623 B2
(45) Date of Patent: *Oct. 12, 2021

(54) ATHLETIC GEAR OR OTHER DEVICES COMPRISING POST-MOLDED EXPANDABLE COMPONENTS

(71) Applicant: BAUER HOCKEY LTD., Blainville (CA)

(72) Inventors: Thierry Krick, Coteau-du-Lac (CA); François Asselin, Mirabel (CA); Jean-François Laperrière, Prévost (CA); Martin Ladouceur, Mirabel (CA); Ivan Labonté, Montreal (CA); Marco Beauregard, Morin-Heights (CA)

(73) Assignee: BAUER HOCKEY LLC, Exeter, NH (US)

( * ) Notice: Subject to any disclaimer, the term of this patent is extended or adjusted under 35 U.S.C. 154(b) by 287 days.

This patent is subject to a terminal disclaimer.

(21) Appl. No.: 16/076,921

(22) PCT Filed: Feb. 9, 2017

(86) PCT No.: PCT/CA2017/050154
§ 371 (c)(1),
(2) Date: Aug. 9, 2018

(87) PCT Pub. No.: WO2017/136941
PCT Pub. Date: Aug. 17, 2017

(65) Prior Publication Data
US 2019/0048165 A1   Feb. 14, 2019

Related U.S. Application Data

(60) Provisional application No. 62/292,947, filed on Feb. 9, 2016.

(51) Int. Cl.
*B29C 64/00* (2017.01)
*C08J 9/32* (2006.01)
(Continued)

(52) U.S. Cl.
CPC ............... *C08J 9/32* (2013.01); *A42B 3/125* (2013.01); *A42C 2/007* (2013.01); *A63B 59/20* (2015.10);
(Continued)

(58) Field of Classification Search
CPC ...... C08J 9/32; C08J 2203/22; C08J 2300/26; C08J 2375/04; A63B 59/70; A63B 71/12;
(Continued)

(56) References Cited

U.S. PATENT DOCUMENTS 5,911,940 A   6/1999 Walton et al.
5,947,918 A * 9/1999 Jones .................. A63B 71/085
602/58
(Continued)

FOREIGN PATENT DOCUMENTS

| CN | 101259741 | 12/2010 |
|---|---|---|
| WO | WO2014100462 | 6/2014 |
| WO | WO2017136941 | 8/2017 |

OTHER PUBLICATIONS

International Search Report dated Apr. 27, 2017 in connection with International Patent Application No. PCT/CA2017/050154.
(Continued)

*Primary Examiner* — Nahida Sultana

(57) ABSTRACT

A device (e.g., an article of athletic gear) comprising a post-molded expandable component, which is a part of the device that is configured to be expanded or has been expanded after being molded. This may allow the post-molded expandable component to have enhanced characteristics (e.g., be more shock-absorbent, lighter, etc.), to be
(Continued)

cost-effectively manufactured (e.g., by using less material and/or making it in various sizes), and/or to be customized for a user (e.g., by custom-fitting it to the user).

60 Claims, 38 Drawing Sheets

(51) Int. Cl.
| | |
|---|---|
| *A42B 3/12* | (2006.01) |
| *A42C 2/00* | (2006.01) |
| *B29C 51/00* | (2006.01) |
| *B29C 51/08* | (2006.01) |
| *B33Y 80/00* | (2015.01) |
| *A63B 59/70* | (2015.01) |
| *A63B 71/12* | (2006.01) |
| *A63B 71/14* | (2006.01) |
| *A63B 59/20* | (2015.01) |
| *A63B 59/54* | (2015.01) |
| *B29C 51/02* | (2006.01) |
| *B29L 31/48* | (2006.01) |
| *B29L 31/52* | (2006.01) |
| *B29K 105/04* | (2006.01) |
| *B29K 21/00* | (2006.01) |
| *B29K 83/00* | (2006.01) |
| *B29K 105/00* | (2006.01) |
| *B29C 44/34* | (2006.01) |
| *A63B 102/18* | (2015.01) |
| *A63B 102/14* | (2015.01) |
| *A63B 102/24* | (2015.01) |

(52) U.S. Cl.
CPC .............. *A63B 59/54* (2015.10); *A63B 59/70* (2015.10); *A63B 71/12* (2013.01); *A63B 71/1225* (2013.01); *A63B 71/143* (2013.01); *B29C 51/00* (2013.01); *B29C 51/002* (2013.01); *B29C 51/02* (2013.01); *B29C 51/082* (2013.01); *B33Y 80/00* (2014.12); *A63B 2071/125* (2013.01); *A63B 2071/1208* (2013.01); *A63B 2071/1258* (2013.01); *A63B 2102/14* (2015.10); *A63B 2102/18* (2015.10); *A63B 2102/182* (2015.10); *A63B 2102/24* (2015.10); *B29C 44/3484* (2013.01); *B29K 2021/00* (2013.01); *B29K 2021/003* (2013.01); *B29K 2021/006* (2013.01); *B29K 2083/00* (2013.01); *B29K 2105/0076* (2013.01); *B29K 2105/048* (2013.01); *B29K 2995/0063* (2013.01); *B29L 2031/4821* (2013.01); *B29L 2031/5227* (2013.01); *C08J 2203/22* (2013.01); *C08J 2300/26* (2013.01); *C08J 2375/04* (2013.01)

(58) Field of Classification Search
CPC ... A63B 71/143; A63B 71/1225; A63B 59/20; A63B 59/54; A63B 3/125; A63B 2071/1208; A63B 2071/1258; A63B 2102/182; A63B 2071/125; A63B 2102/14; A63B 2102/18; A63B 2102/24; B29C 51/00; B29C 51/02; B29C 51/002; B29C 51/082; B29C 44/3484; A42C 2/007; B33Y 80/00; B29K 2021/00; B29K 2083/00; B29K 2105/0076; B29K 2021/003; B29K 2021/006; B29K 2995/0063; B29K 2105/048; B29L 2031/4821; B29L 2031/5227
See application file for complete search history.

(56) References Cited

U.S. PATENT DOCUMENTS

| | | | |
|---|---|---|---|
| 6,525,125 B1* | 2/2003 | Giardello | A63B 53/04 |
| | | | 524/439 |
| 7,807,729 B2 | 10/2010 | Masuda et al. | |
| 9,788,600 B2* | 10/2017 | Wawrousek | A43B 13/181 |
| 2005/0027025 A1* | 2/2005 | Erb | A43B 7/28 |
| | | | 521/50 |
| 2005/0197413 A1 | 9/2005 | Grimm et al. | |
| 2012/0114897 A1 | 5/2012 | Thgiagarajan et al. | |
| 2013/0025031 A1* | 1/2013 | Laperriere | A42B 3/125 |
| | | | 2/414 |
| 2013/0161874 A1* | 6/2013 | Horiuchi | B29C 44/0461 |
| | | | 264/415 |
| 2014/0201889 A1* | 7/2014 | Pietrzak | B33Y 50/02 |
| | | | 2/410 |
| 2014/0208486 A1* | 7/2014 | Krueger | A42B 3/064 |
| | | | 2/414 |
| 2015/0038272 A1* | 2/2015 | Davis | A63B 60/00 |
| | | | 473/563 |
| 2015/0051153 A1 | 2/2015 | Reshetnyak et al. | |
| 2015/0133244 A1* | 5/2015 | Davis | A63B 60/00 |
| | | | 473/563 |
| 2017/0120515 A1 | 5/2017 | Rolland et al. | |
| 2017/0274588 A1* | 9/2017 | Maue | B32B 3/06 |
| 2017/0280819 A1 | 10/2017 | Corbeil et al. | |
| 2018/0155518 A1 | 6/2018 | Koshita et al. | |
| 2018/0258280 A1 | 9/2018 | Grechi et al. | |
| 2020/0113267 A1* | 4/2020 | Light | B33Y 10/00 |
| 2020/0255618 A1 | 8/2020 | Krick et al. | |

OTHER PUBLICATIONS

Written Opinion dated Apr. 27, 2017 in connection with International Patent Application No. PCT/CA2017/050154.
Restriction Requirement dated Jun. 9, 2020 in connection with U.S. Appl. No. 16/863,900, 7 pages.
Office Action dated Aug. 31, 2020 in connection with U.S. Appl. No. 16/863,900, 10 pages.

* cited by examiner

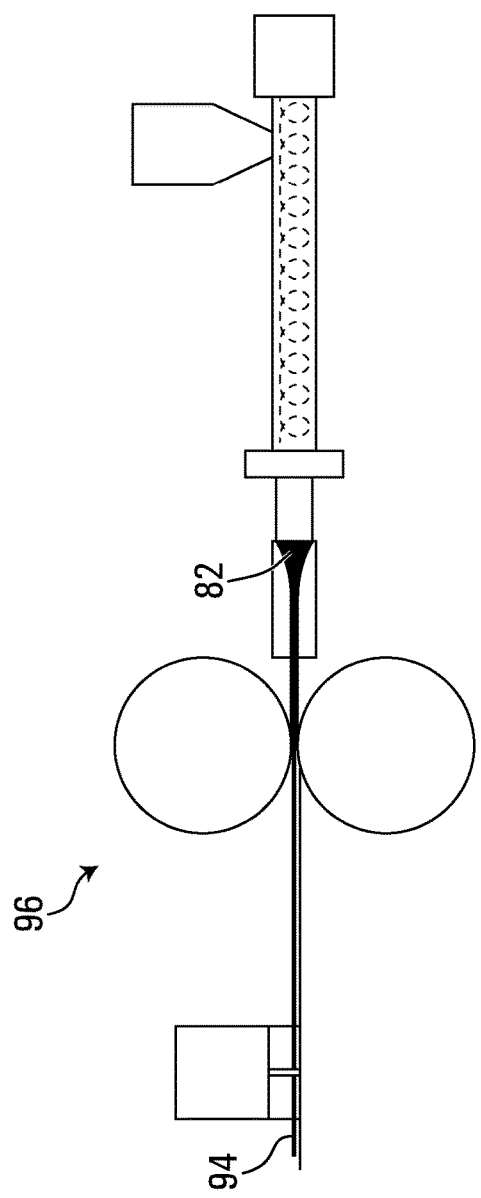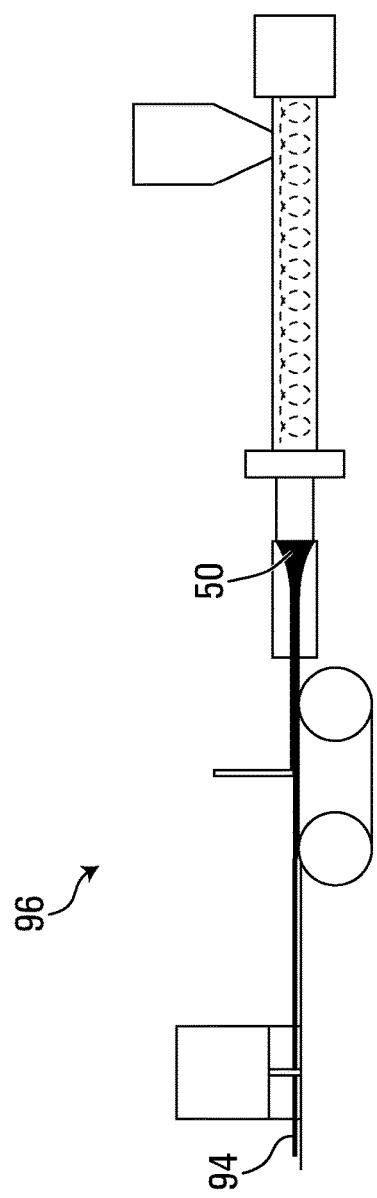

ATHLETIC GEAR OR OTHER DEVICES COMPRISING POST-MOLDED EXPANDABLE COMPONENTS

CROSS-REFERENCE TO RELATED APPLICATION

This application claims priority from U.S. Provisional Patent Application 62/292,947 filed on Feb. 9, 2016 and incorporated by reference herein.

FIELD

The invention generally relates to devices (e.g., athletic gear, personal protective equipment, clothing, etc.) comprising molded parts and to materials from which these molded parts are made.

BACKGROUND

Manufacturing of various devices often involves molding parts of these devices, such as by injection molding, compression molding, thermoforming, etc. For example, athletic gear such as helmets, shoulder pads, sporting implements (e.g., hockey sticks), etc., typically comprise molded parts.

Molding of parts usually entails providing materials (e.g., as liquids, solids, semi-solids, or paste) in molds in which these materials are formed to substantially final dimensions of the parts. In some cases, this may present certain drawbacks. For example, molding parts of different sizes normally requires molds of different sizes. As another example, characteristics of molded parts are often dictated or affected by their molding process.

For these and other reasons, there is a need to improve devices comprising molded parts.

SUMMARY

According to various aspects of the invention, there is provided a device (e.g., an article of athletic gear) comprising a post-molded expandable component, which is a part of the device that is configured to be expanded or has been expanded after being molded. This may allow the post-molded expandable component to have enhanced characteristics (e.g., be more shock-absorbent, lighter, etc.), to be cost-effectively manufactured (e.g., by using less material and/or making it in various sizes), and/or to be customized for a user (e.g., by custom-fitting it to the user).

For example, according to an aspect of the invention, there is provided a component comprising an expandable material molded into an initial shape and expandable to an expanded shape that is a scaled-up version of the initial shape in response to a stimulus after molding.

According to another aspect of the invention, there is provided a component comprising a material molded into a shape. The material comprises a polymeric substance and expandable microspheres. The expandable microspheres constitute at least 10% of the material by weight. A resilience of the material is less than a resilience of the expandable microspheres according to ASTM D2632-01.

According to another aspect of the invention, there is provided a component comprising a material molded into a shape. The material comprises a polymeric substance and expandable microspheres. The expandable microspheres constitute at least 10% of the material by weight. A resilience of the material is no more than 40% according to ASTM D2632-01.

According to another aspect of the invention, there is provided a component comprising a material molded into a shape. The material comprises a polymeric substance and expandable microspheres. The expandable microspheres constitute at least 10% of the material by weight. A tensile strength of the material is greater than a tensile strength of the expandable microspheres.

According to another aspect of the invention, there is provided a component comprising a material molded into a shape. The material comprises a polymeric substance and expandable microspheres. The expandable microspheres constitute at least 10% of the material by weight. A tensile strength of the material is at least 0.9 MPa.

According to another aspect of the invention, there is provided a component comprising a material molded into a shape. The material comprises a polymeric substance and expandable microspheres. The expandable microspheres constitute at least 10% of the material by weight. An elongation at break of the material is greater than an elongation at break of the expandable microspheres.

According to another aspect of the invention, there is provided a component comprising a material molded into a shape. The material comprises a polymeric substance and expandable microspheres. The expandable microspheres constitute at least 10% of the material by weight. An elongation at break of the material is at least 20%.

According to another aspect of the invention, there is provided a component comprising an expandable material molded into an initial shape and expandable to an expanded shape that is a scaled-up version of the initial shape in response to a stimulus after molding. The expandable material comprises a polymeric substance and an expansion agent. A temperature of the expandable material during molding is lower than an expansion temperature of the expansion agent.

According to another aspect of the invention, there is provided a component comprising an expandable material molded into an initial shape and expandable to an expanded shape that is a scaled-up version of the initial shape in response to a stimulus initiated a substantial amount of time after molding.

According to another aspect of the invention, there is provided a component comprising an expandable material molded into an initial shape in a mold and expandable to an expanded shape that is a scaled-up version of the initial shape in response to a stimulus upon removal from the mold.

According to another aspect of the invention, there is provided a method of making a component. The method comprises: causing molding of an expandable material into an initial shape; and causing expansion of the expandable material to an expanded shape that is a scaled-up version of the initial shape in response to a stimulus after the molding of the expandable material.

According to another aspect of the invention, there is provided a device comprising a component as discussed above. In various examples, the device may be an article of athletic gear for a user, such as an article of protective athletic gear wearable by the user to protect the user or a sports implement for handling by the user.

These and other aspects of the invention will now become apparent to those of ordinary skill in the art upon review of the following description of embodiments of the invention in conjunction with the accompanying drawings.

BRIEF DESCRIPTION OF THE DRAWINGS

A detailed description of embodiments of the invention is provided below, by way of example only, with reference to the accompanying drawings, in which:

FIGS. 25A and 25B show examples of an extrusion mechanism for forming the expandable material into a thermoformable sheet in accordance with another variant;

It is to be expressly understood that the description and drawings are only for the purpose of illustrating certain embodiments of the invention and are an aid for understanding. They are not intended to be a definition of the limits of the invention.

DETAILED DESCRIPTION OF EMBODIMENTS

Figure 1:
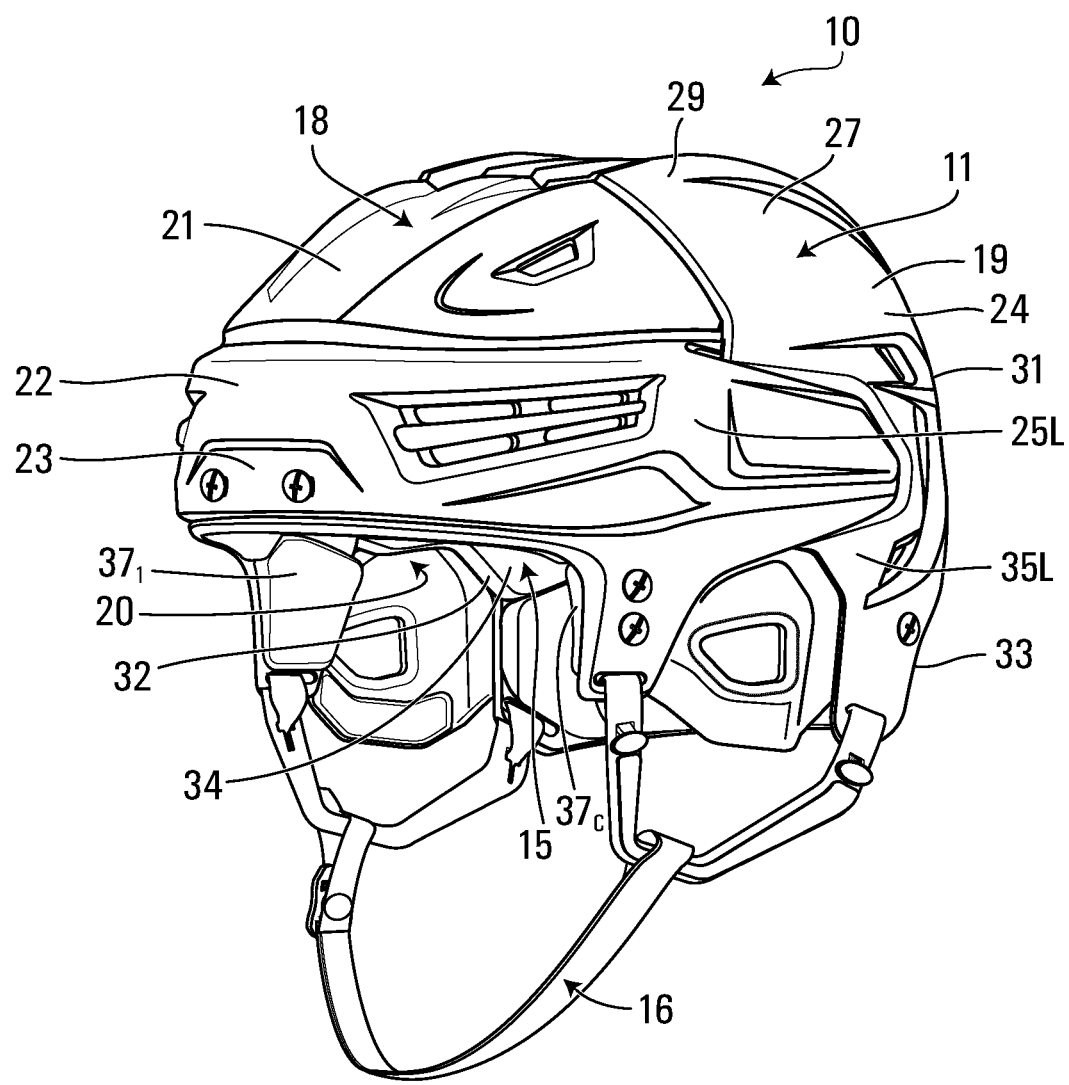
FIG. 1 shows an example of a device comprising a plurality of post-molded expandable components in accordance with an embodiment of the invention, in which the device is a helmet for protecting a user's head.
Figure 2:
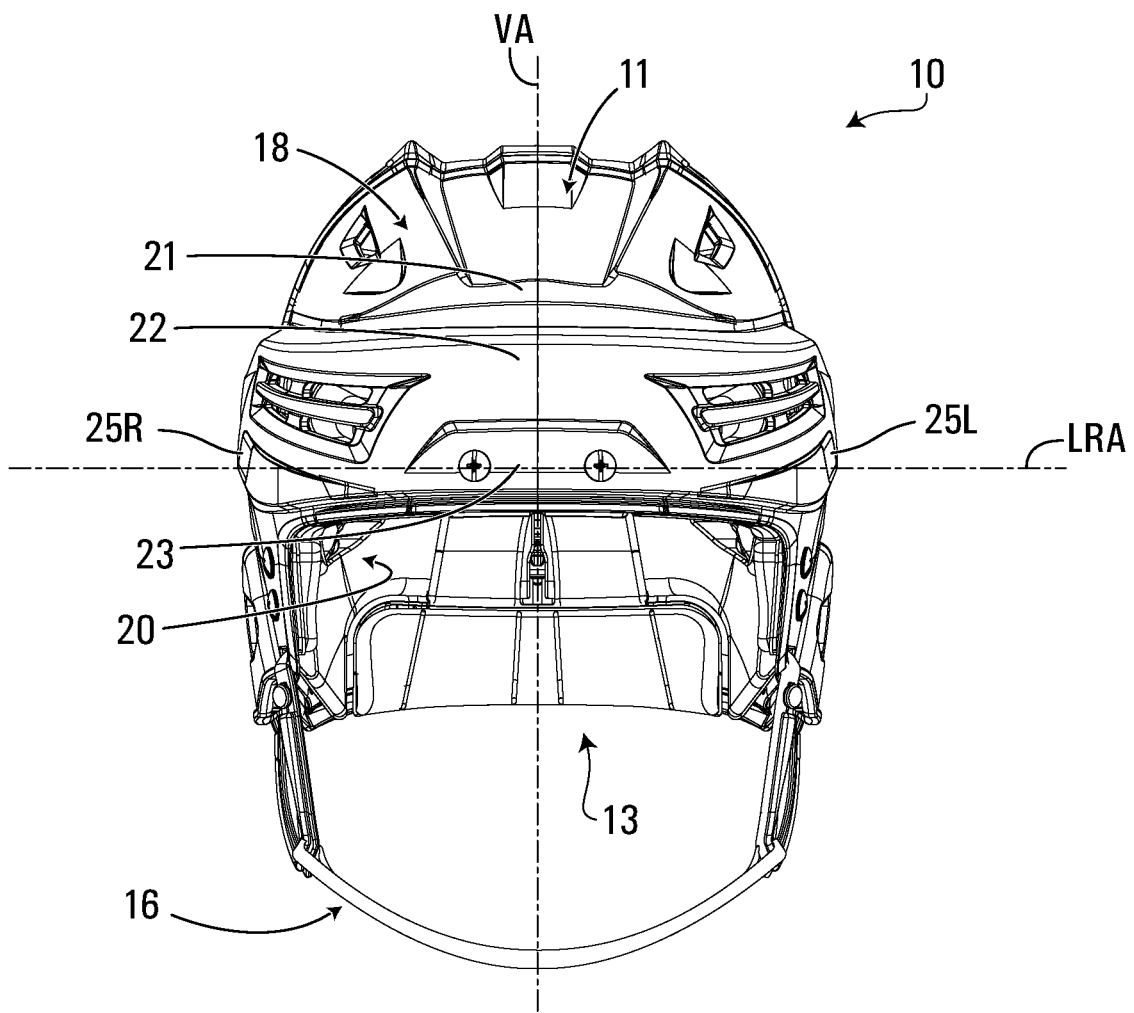
FIG. 2 shows a front view of the helmet.
Figure 3:
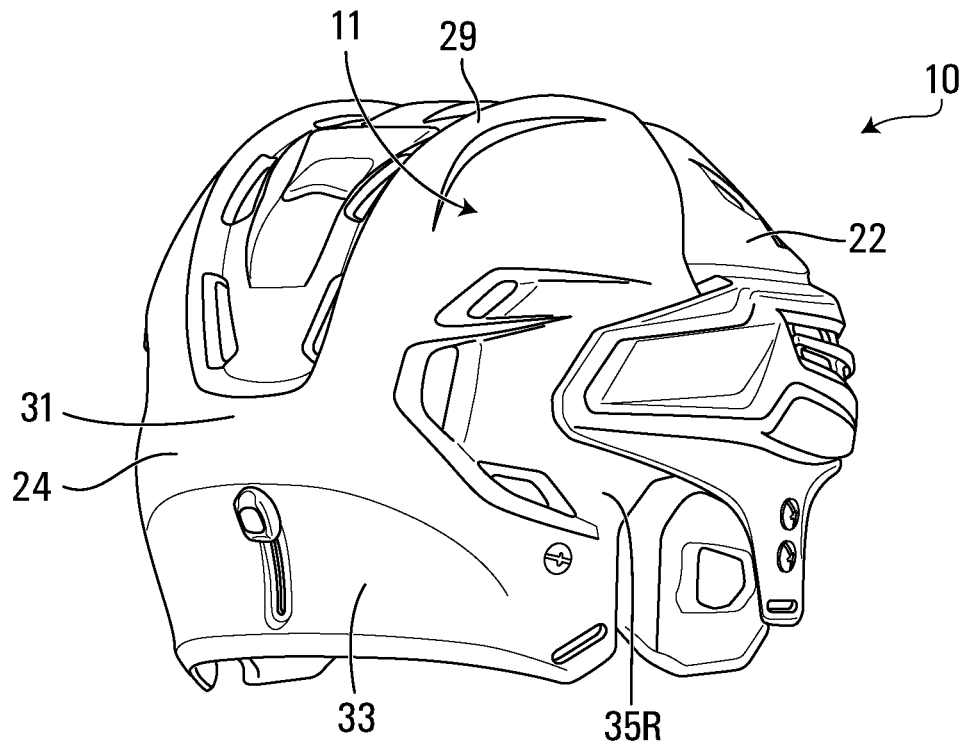
FIGS. 3 and 4 show rear perspective views of the helmet.
Figure 4:
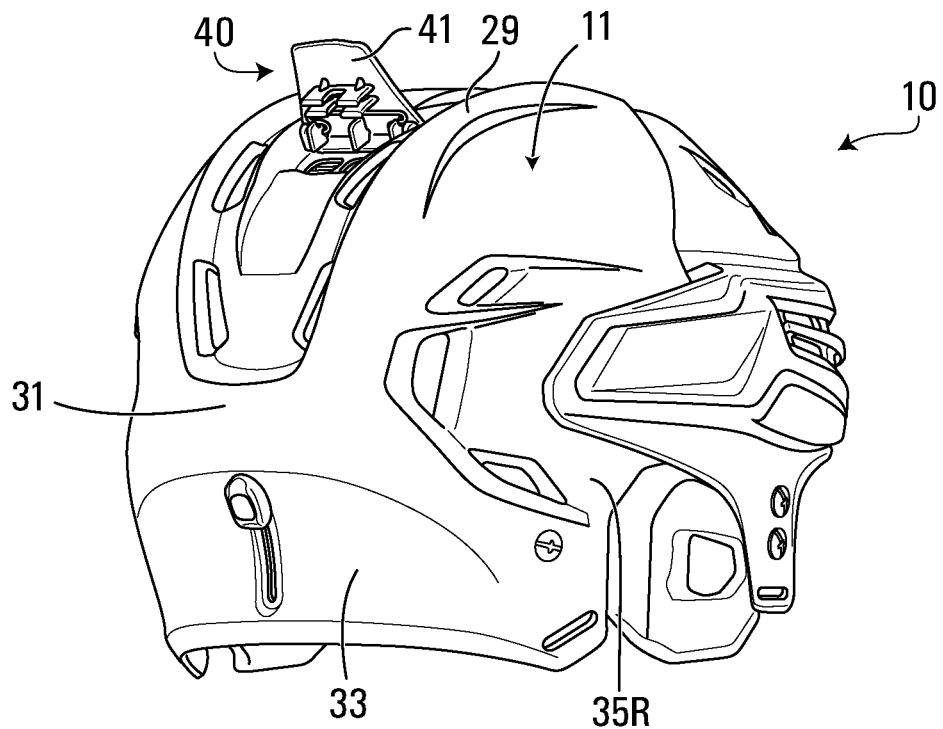

FIG. 1 shows an example of a device 10 comprising a plurality of post-molded expandable components $12_1$-$12_E$ in accordance with an embodiment of the invention. In this embodiment, the device 10 is an article of athletic gear for a user engaging in a sport or other athletic activity. More particularly, in this embodiment, the article of athletic gear 10 is an article of protective athletic gear wearable by the user to protect him/her. Specifically, in this example, the article of protective athletic gear 10 is a helmet for protecting a head of the user against impacts. In this case, the helmet 10 is a hockey helmet for protecting the head of the user, who is a hockey player, against impacts (e.g., from a puck or ball, a hockey stick, a board, ice or another playing surface, etc., with another player, etc.).

Each of the post-molded expandable components $12_1$-$12_E$ of the helmet 10 is a part of the helmet 10 that is configured to be expanded or has been expanded after being molded (i.e., shaped in a mold). This may allow each of the post-molded expandable components $12_1$-$12_E$ of the helmet 10 to have enhanced characteristics (e.g., be more shock-absorbent, lighter, etc.), to be cost-effectively manufactured (e.g., by using less material and/or making it in various sizes), and/or to be customized for the user (e.g., by custom-fitting it to the user in-store or at another location where it can be expanded to conform to the user).

In this embodiment, the helmet 10 comprises an outer shell 11 and an inner liner 15 that includes the post-molded expandable components $12_1$-$12_E$ of the helmet 10. The helmet 10 also comprises a chinstrap 16 for securing the helmet 10 to the player's head. The helmet 10 may also comprise a faceguard (not shown) to protect at least part of the player's face (e.g., a grid (sometimes referred to as a "cage") or a visor (sometimes referred to as a "shield")).

Figure 47:
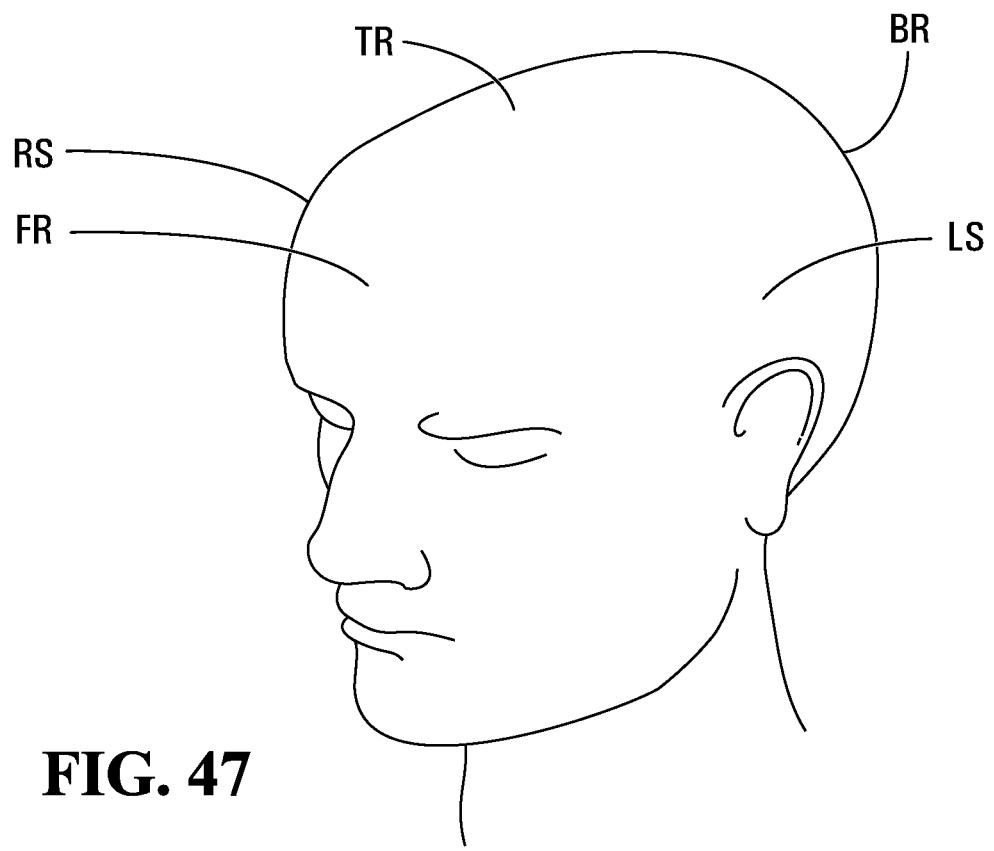
FIGS. 47 and 48 show the head of the user.
Figure 48:
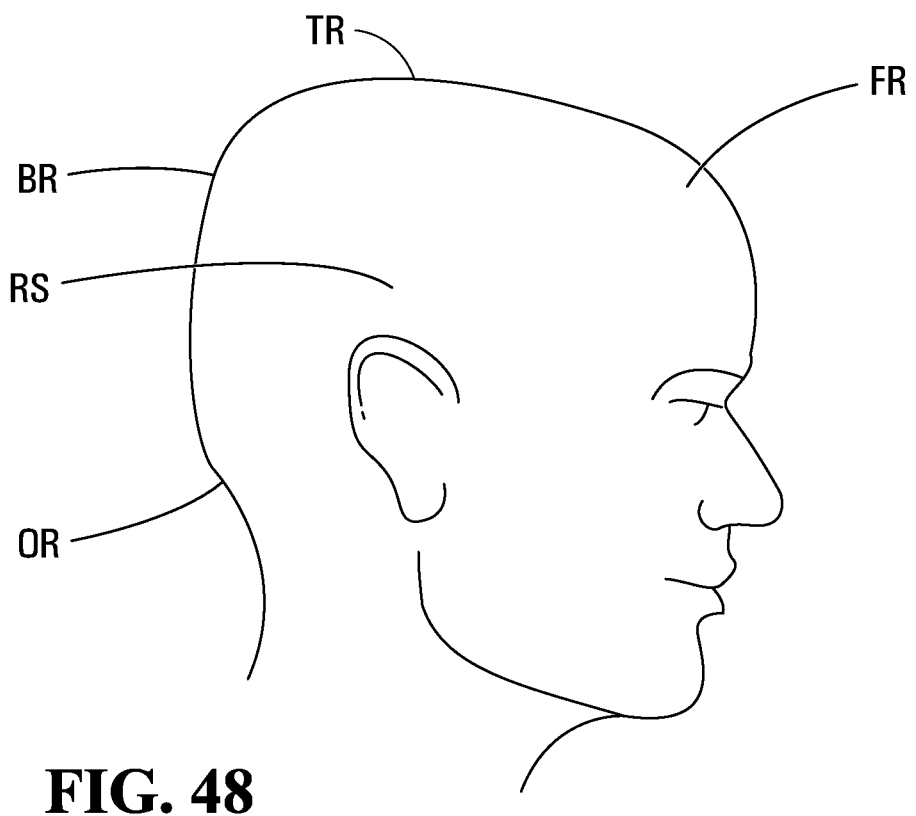

The helmet 10 defines a cavity 13 for receiving the player's head. In response to an impact, the helmet 10 absorbs energy from the impact to protect the player's head. The helmet 10 protects various regions of the player's head. As shown in FIGS. 47 and 48, the player's head comprises a front region FR, a top region TR, left and right side regions LS, RS, a back region BR, and an occipital region OR. The front region FR includes a forehead and a front top part of the player's head and generally corresponds to a frontal bone region of the player's head. The left and right side regions LS, RS are approximately located above the player's ears. The back region BR is opposite the front region FR and includes a rear upper part of the player's head. The occipital region OR substantially corresponds to a region around and under the head's occipital protuberance.

The helmet 10 comprises an external surface 18 and an internal surface 20 that contacts the player's head when the helmet 10 is worn. The helmet 10 has a front-back axis FBA, a left-right axis LRA, and a vertical axis VA which are respectively generally parallel to a dorsoventral axis, a dextrosinistral axis, and a cephalocaudal axis of the player when the helmet 10 is worn and which respectively define a front-back direction, a lateral direction, and a vertical direction of the helmet 10. Since they are generally oriented longitudinally and transversally of the helmet 10, the front-back axis FBA and the left-right axis LRA can also be referred to as a longitudinal axis and a transversal axis, respectively, while the front-back direction and the lateral direction can also be referred to a longitudinal direction and a transversal direction, respectfully.

The outer shell 11 provides strength and rigidity to the helmet 10. To that end, the outer shell 11 comprises a rigid material 27. For example, in various embodiments, the rigid material 27 of the outer shell 11 may be a thermoplastic material such as polyethylene (PE), polyamide (nylon), or polycarbonate, a thermosetting resin, or any other suitable material. The outer shell 11 includes an inner surface 17 facing the inner liner 15 and an outer surface 19 opposite the inner surface 17. The outer surface 19 of the outer shell 11 constitutes at least part of the external surface 18 of the helmet 10.

In this embodiment, the outer shell 11 comprises a front shell member 22 and a rear shell member 24 that are connected to one another. The front shell member 22 comprises a top portion 21 for facing at least part of the top region TR of the player's head, a front portion 23 for facing at least part of the front region FR of the player's head, and left and right lateral side portions 25L, 25R extending rearwardly from the front portion 23 for facing at least part of the left and right side regions LS, RS of the player's head, respectively. The rear shell member 24 comprises a top portion 29 for facing at least part of the top region TR of the player's head, a back portion 31 for facing at least part of the back region BR of the player's head, an occipital portion 33 for facing at least part of the occipital region OR of the player's head, and left and right lateral side portions 35L, 35R extending forwardly from the back portion 31 for facing at least part of the left and right side regions LS, RS of the player's head, respectively.

Figure 9:
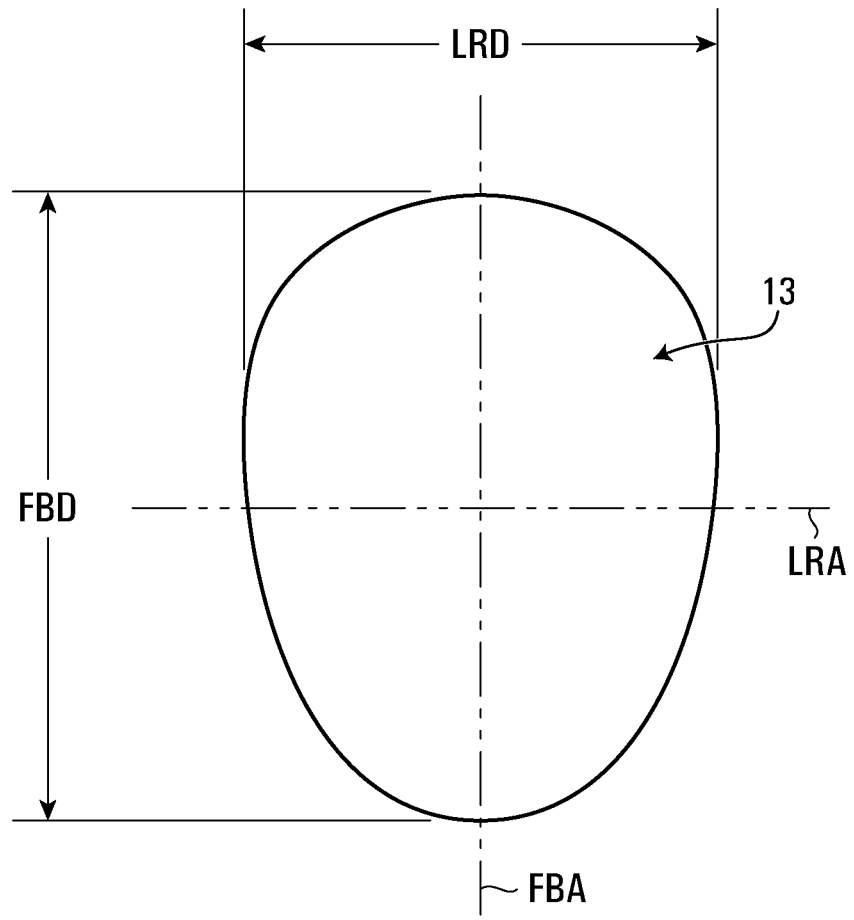
FIG. 9 shows internal dimensions of a head-receiving cavity of the helmet.

In this embodiment, the helmet 10 is adjustable to adjust how it fits on the player's head. To that end, the helmet 10 comprises an adjustment mechanism 40 for adjusting a fit of the helmet 10 on the player's head. The adjustment mechanism 40 may allow the fit of the helmet 10 to be adjusted by adjusting one or more internal dimensions of the cavity 13 of the helmet 10, such as a front-back internal dimension FBD of the cavity 13 in the front-back direction of the helmet 10 and/or a left-right internal dimension LRD of the cavity 13 in the left-right direction of the helmet 10, as shown in FIG. 9.

Figure 5:
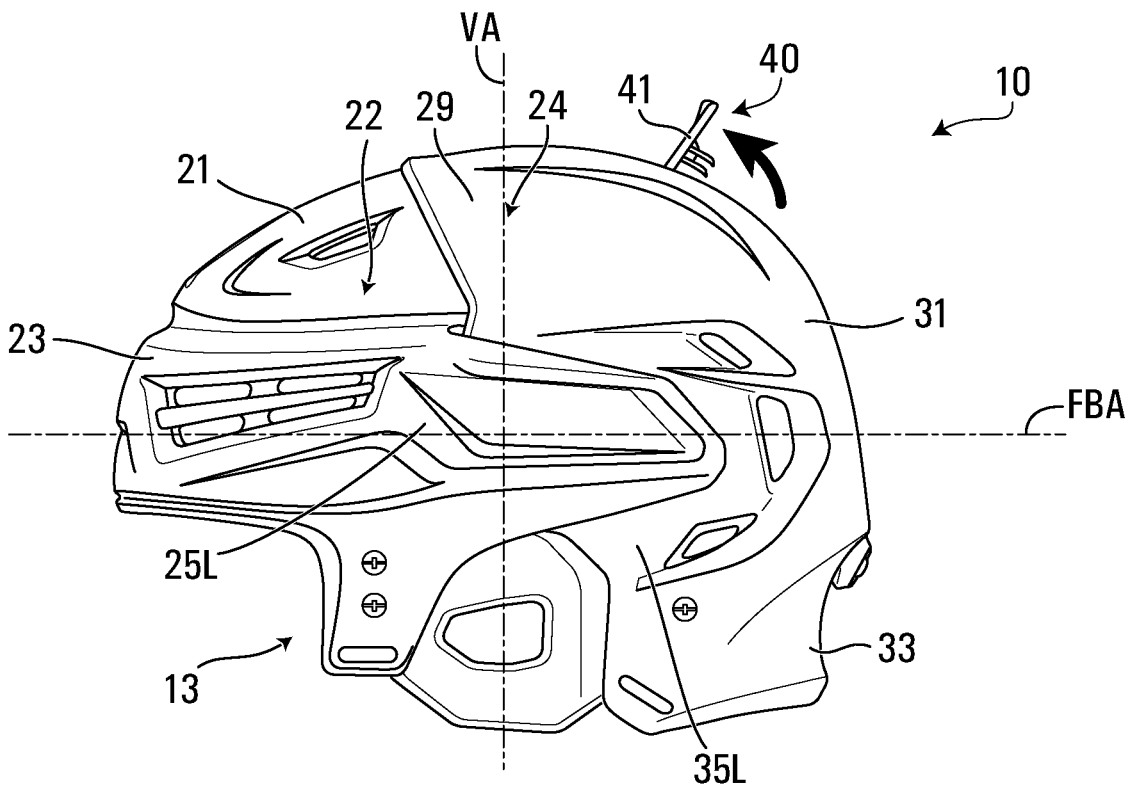
FIGS. 5 to 8 show operation of an example of an adjustment mechanism of the helmet.
Figure 6:
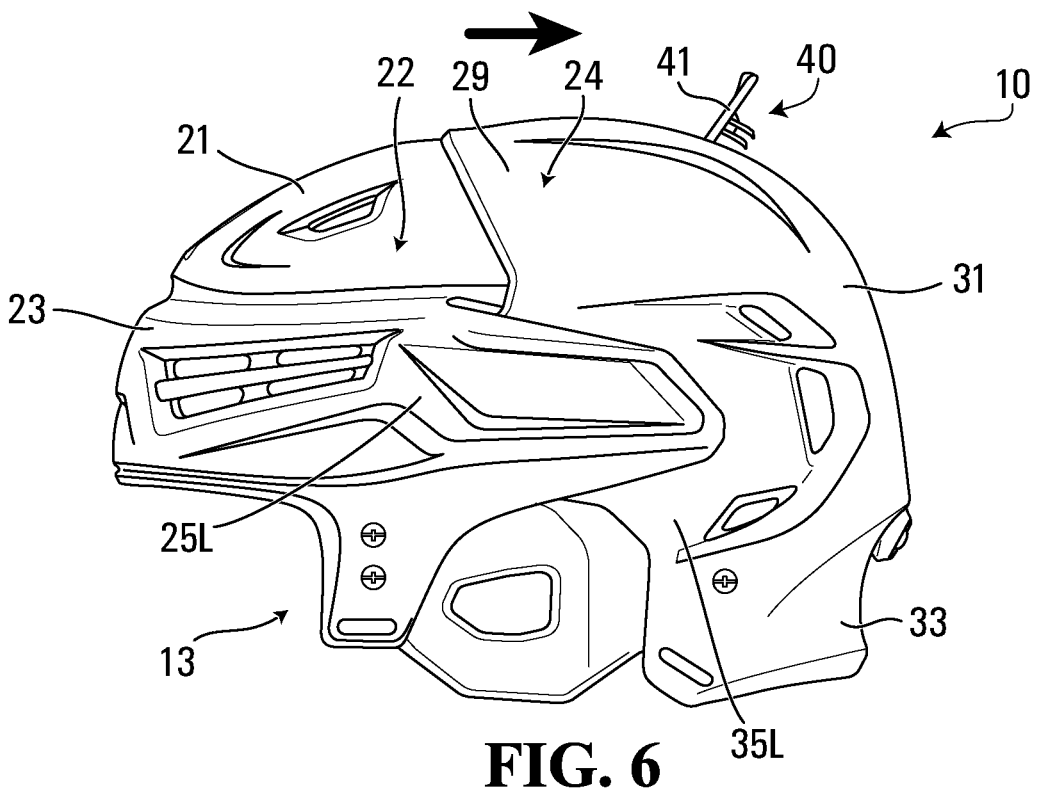
Figure 7:
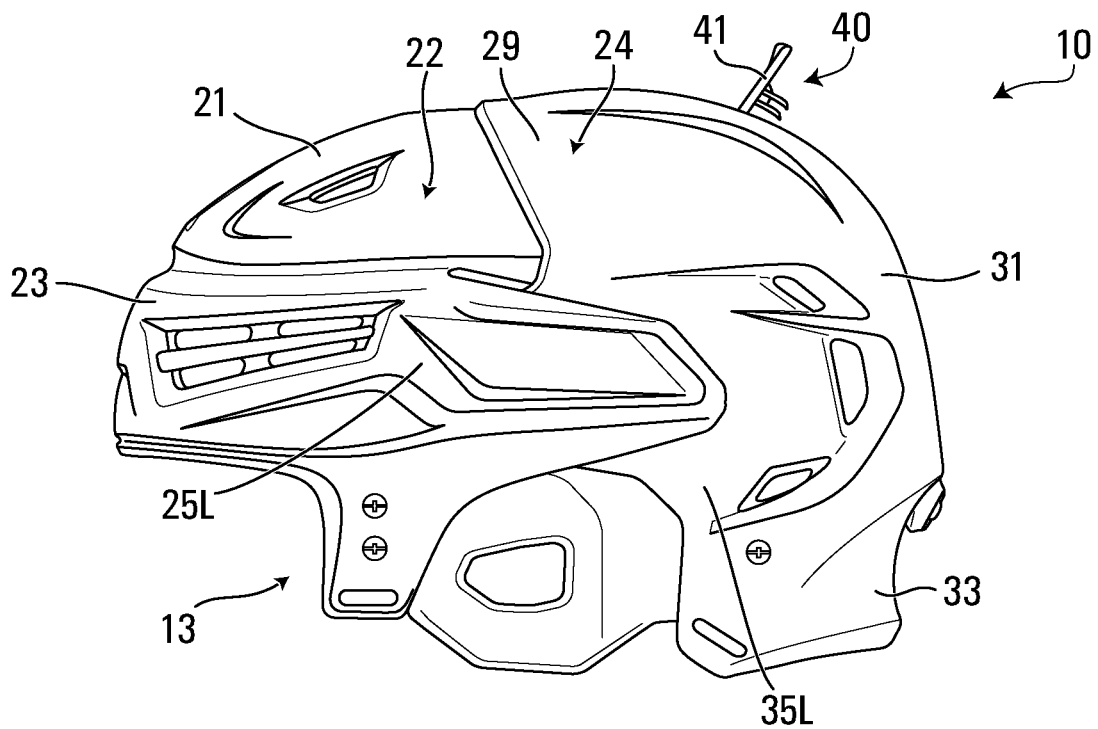
Figure 8:
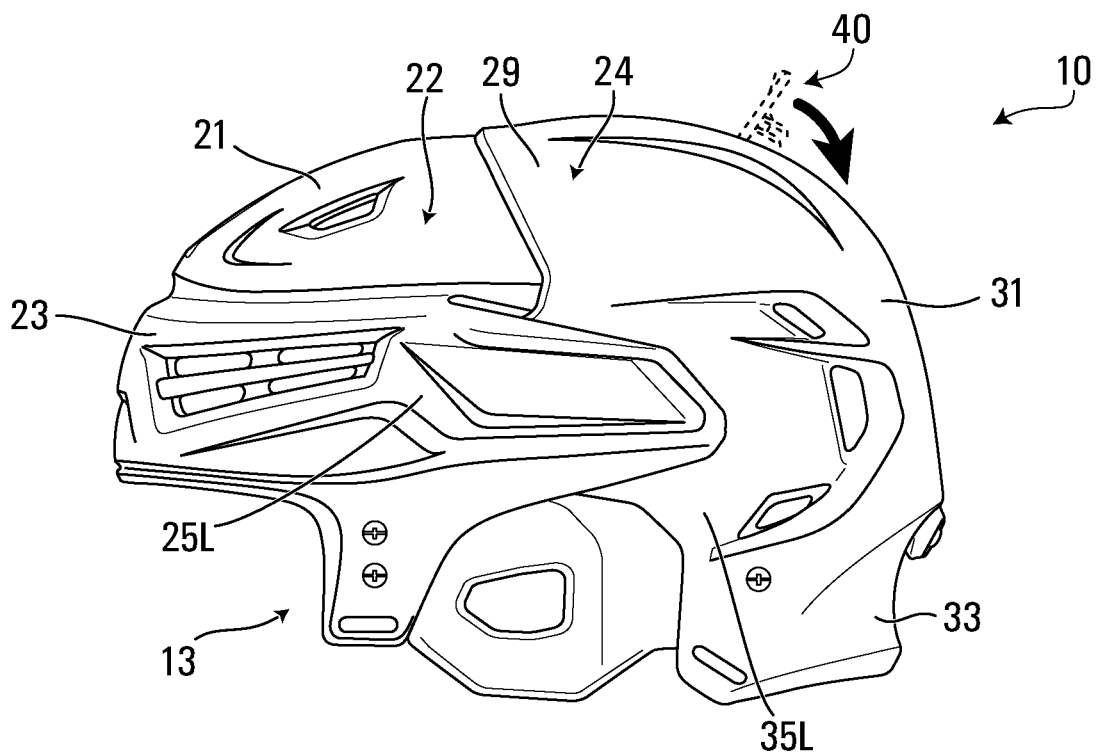

More particularly, in this embodiment, the adjustment mechanism 40 is configured such that the outer shell 11 and the inner liner 15 are adjustable to adjust the fit of the helmet 10 on the player's head. To that end, in this embodiment, the front shell member 22 and the rear shell member 24 are movable relative to one another to adjust the fit of the helmet 10 on the player's head. In this example, relative movement of the outer shell members 22, 24 for adjustment purposes is in the front-back direction of the helmet 10 such that the front-back internal dimension FBD of the cavity 13 of the helmet 10 is adjusted. This is shown in FIGS. 5 to 8 in which the rear shell member 24 is moved relative to the front shell member 22 from a first position, which is shown in FIG. 5 and which corresponds to a minimum size of the helmet 10, to a second position, which is shown in FIG. 6 and which corresponds to an intermediate size of the helmet 10, and to a third position, which is shown in FIGS. 7 and 8 and which corresponds to a maximum size of the helmet 10.

Figure 10:
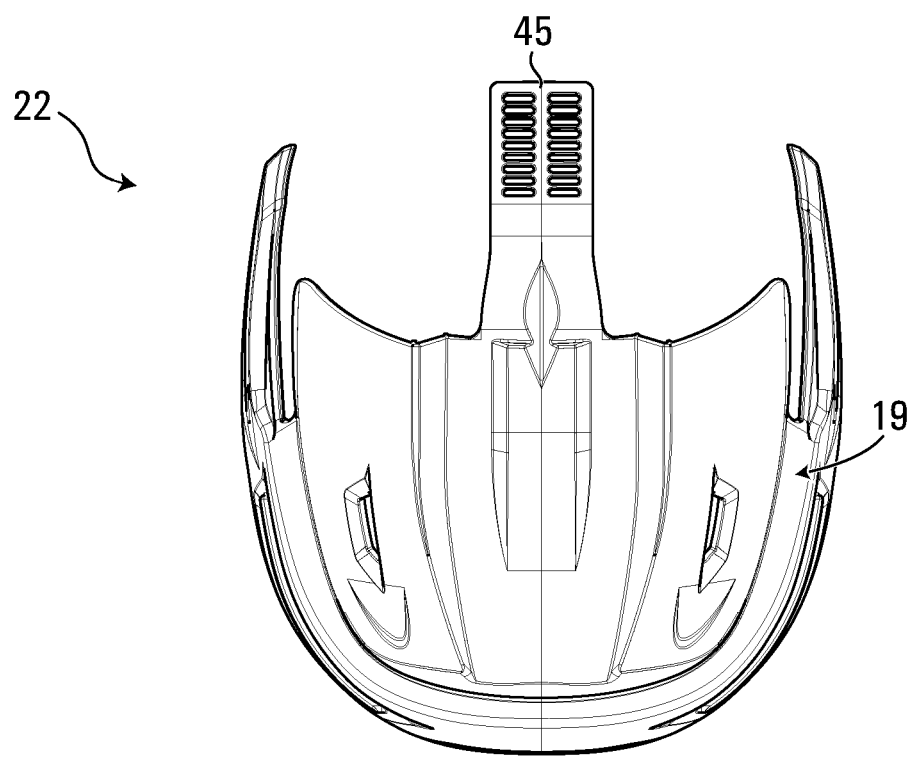
FIGS. 10 and 11 show an example of shell members of an outer shell of the helmet.
Figure 11:
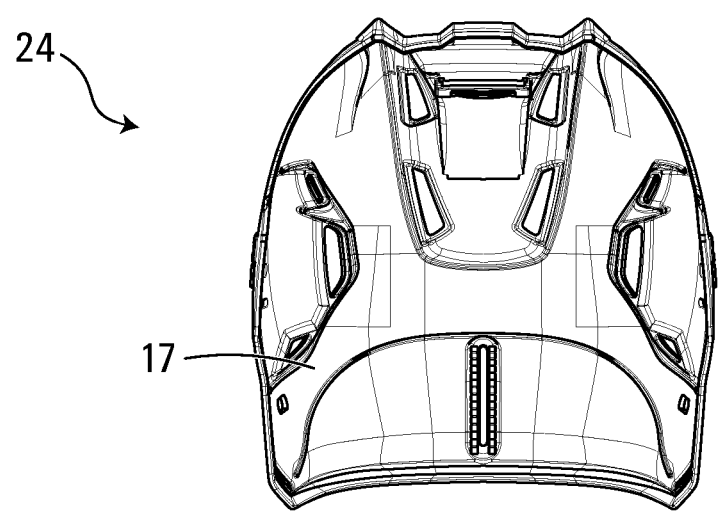
Figure 12:
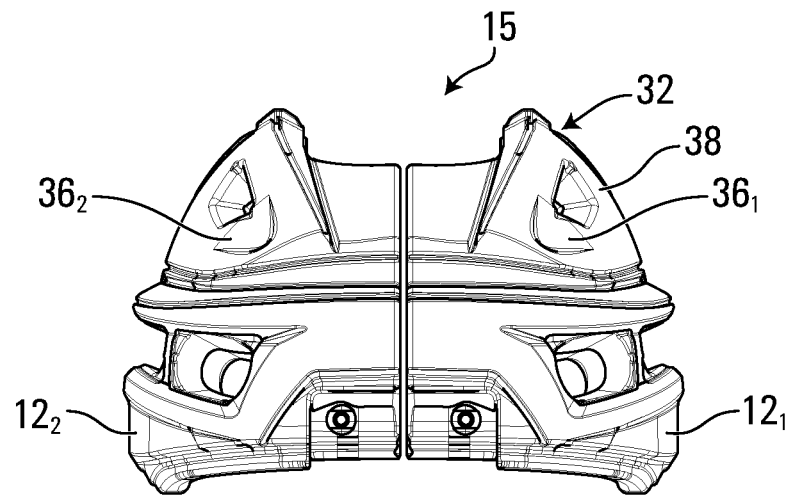
FIGS. 12 to 16 show an example of a plurality of post-molded expandable components constituting a plurality of pads of an inner liner of the helmet.
Figure 13:
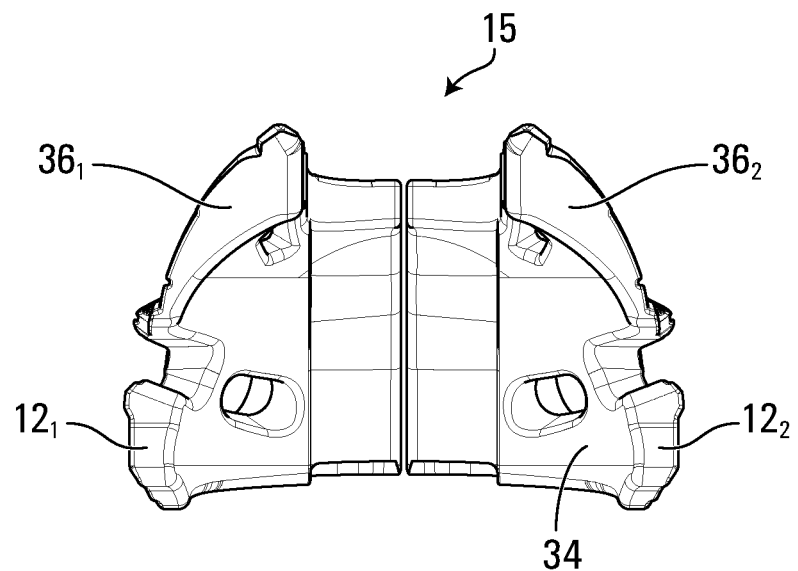
Figure 14:
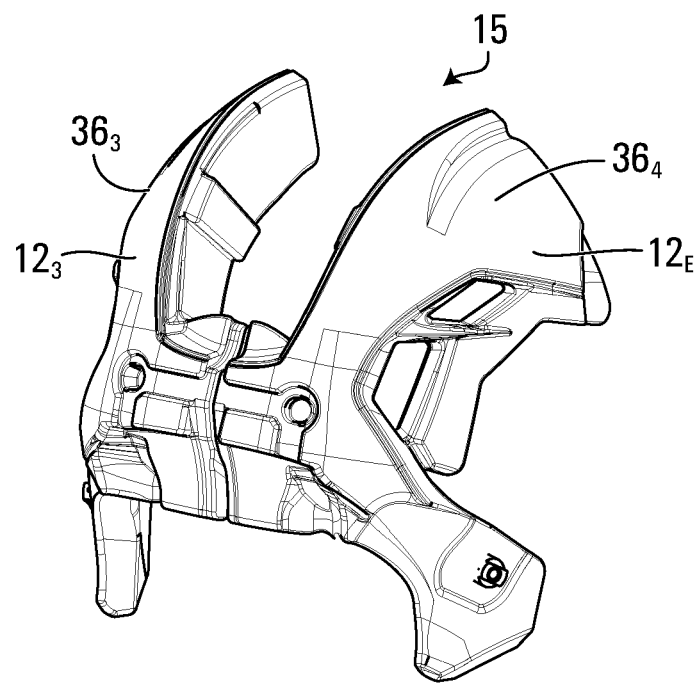
Figure 15:
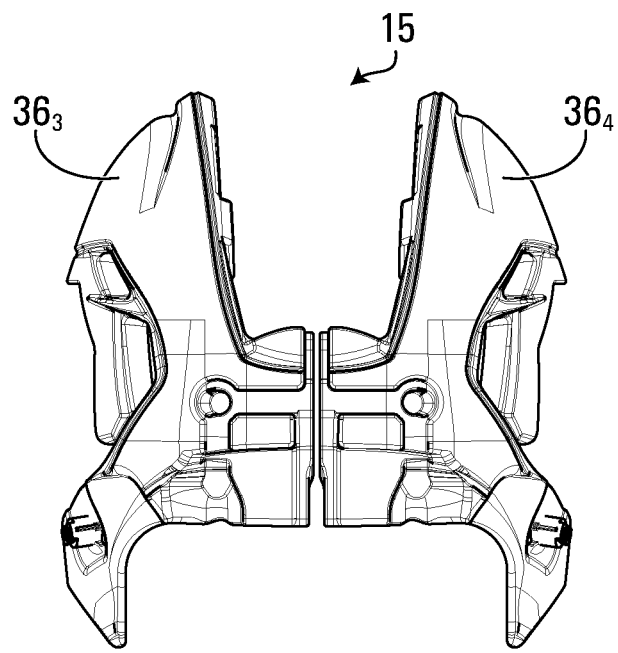
Figure 16:
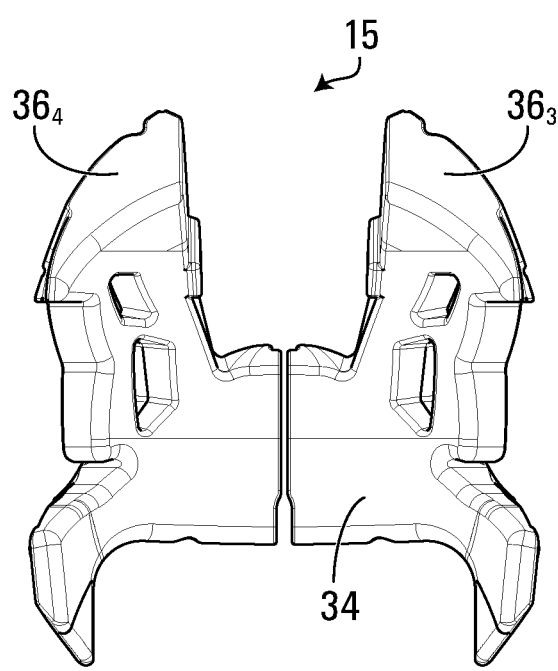

In this example of implementation, the adjustment mechanism 40 comprises an actuator 41 that can be moved (in this case pivoted) by the player between a locked position, in which the actuator 41 engages a locking part 45 (as best shown in FIGS. 10 and 11) of the front shell member 22 and thereby locks the outer shell members 22, 24 relative to one another, and a release position, in which the actuator 41 is disengaged from the locking part 45 of the front shell member 22 and thereby permits the outer shell members 22, 24 to move relative to one another so as to adjust the size of the helmet 10. The adjustment mechanism 40 may be implemented in any other suitably way in other embodiments.

The inner liner 15 is disposed between the outer shell 11 and the player's head to absorb impact energy when the helmet 10 is impacted. More particularly, the inner liner 15 comprises a shock-absorbing structure 32 that includes an outer surface 38 facing towards the outer shell 11 and an inner surface 34 facing towards the player's head. For example, in some embodiments, the shock-absorbing structure 32 of the inner liner 15 may comprise a shock-absorbing material. For instance, in some cases, the shock-absorbing material may include a polymeric cellular material, such as a polymeric foam (e.g., expanded polypropylene (EPP) foam, expanded polyethylene (EPE) foam, or any other suitable polymeric foam material), or expanded polymeric microspheres (e.g., Expancel™ microspheres commercialized by Akzo Nobel). Any other material with suitable impact energy absorption may be used in other embodiments. Additionally or alternatively, in some embodiments, the shock-absorbing structure 32 of the inner liner 15 may comprise an array of shock absorbers that are configured to deform when the helmet 10 is impacted. For instance, in some cases, the array of shock absorbers may include an array of compressible cells that can compress when the helmet 10 is impacted. Examples of this are described in U.S. Pat. No. 7,677,538 and U.S. Patent Application Publication 2010/0258988, which are incorporated by reference herein.

The inner liner 15 may be mounted to the outer shell 11 in any suitable way. For example, in some embodiments, the inner liner 15 may be mounted to the outer shell 11 by one or more fasteners such as mechanical fasteners (e.g., tacks, staples, rivets, screws, stitches, etc.), an adhesive, or any other suitable fastener.

In this embodiment, the inner liner 15 comprises a plurality of pads $36_1$-$36_4$, $37_1$-$37_C$ disposed between the outer shell 11 and the player's head when the helmet 10 is worn. In this example, respective ones of the pads $36_1$-$36_4$, $37_1$-$37_C$ are movable relative to one another and with the outer shell members 22, 24 to allow adjustment of the fit of the helmet 10 using the adjustment mechanism 40.

The pads $36_1$-$36_4$ are responsible for absorbing at least a bulk of the impact energy transmitted to the inner liner 15 when the helmet 10 is impacted and can therefore be referred to as "absorption" pads. In this embodiment, the pad $36_1$ is for facing at least part of the front region FR and left side region LS of the player's head, the pad $36_2$ is for facing at least part of the front region FR and right side region RS of the player's head, the pad $36_3$ is for facing at least part of the back region BR and left side region LS of the player's head, the pad $36_4$ is for facing at least part of the back region BR and right side region RS of the player's head, and the pad $36_5$ is for facing at least part of the top region TR and back region BR of the player's head. The front shell member 22 overlays the pads $36_1$, $36_2$ while the rear shell member 24 overlays the pads $36_3$, $36_4$.

The pads $37_1$-$37_C$ are responsible to provide comfort to the player's head and can therefore be referred to as "comfort" pads. The comfort pads $37_1$-$37_C$ may comprise any suitable soft material providing comfort to the player. For example, in some embodiments, the comfort pads $37_1$-$37_C$ may comprise polymeric foam such as polyvinyl chloride (PVC) foam, polyurethane foam (e.g., PORON XRD foam commercialized by Rogers Corporation), vinyl nitrile foam or any other suitable polymeric foam material. In some embodiments, given ones of the comfort pads $37_1$-$37_C$ may be secured (e.g., adhered, fastened, etc.) to respective ones of the absorption pads $36_1$-$36_4$. In other embodiments, given ones of the comfort pads $36_1$-$36_4$ may be mounted such that they are movable relative to the absorption pads $37_1$-$37_C$. For example, in some embodiments, one or more of the comfort pads $37_1$-$37_C$ may be part of a floating liner as described in U.S. Patent Application Publication 2013/0025032, which, for instance, may be implemented as the SUSPEND-TECH™ liner member found in the BAUER™ RE-AKT™ and RE-AKT 100™ helmets made available by Bauer Hockey, Inc. The comfort pads $37_1$-$37_C$ may assist in absorption of energy from impacts, in particular, low-energy impacts.

The inner liner 15 comprises the post-molded expandable components $12_1$-$12_E$ of the helmet 10. More particularly, in this embodiment, respective ones of the pads $36_1$-$36_4$ comprise respective ones of the post-molded expandable components $12_1$-$12_E$ of the helmet 10. Specifically, in this example, each post-molded expandable component $12_x$ of the helmet 10 constitutes a pad $36_x$.

Figure 17:
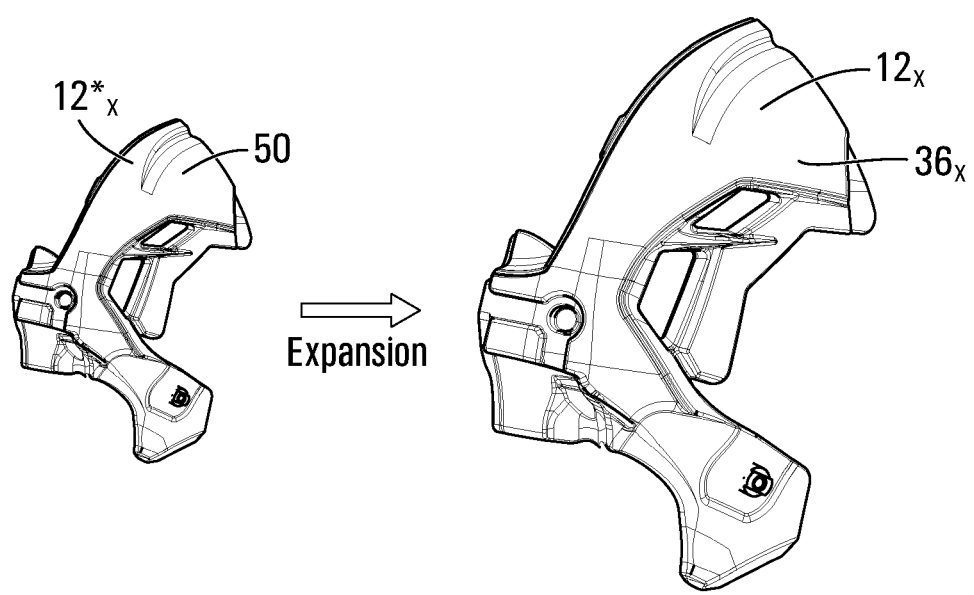
FIG. 17 shows an example of a precursor of a post-molded expandable component being expanded to form the post-molded expandable component.
Figure 18:
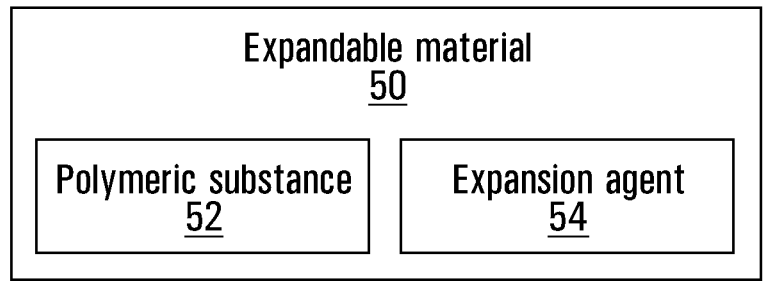
FIG. 18 is a block diagram representing an example of an expandable material of the post-molded expandable component.

With additional reference to FIGS. 17 and 18, the post-molded expandable component $12_x$ of the helmet 10 constituting the pad $36_x$ comprises an expandable material 50 that is molded into a precursor $12_x^*$ which can then be expanded by a stimulus (e.g., heat or another stimulus) to an expanded shape that is a scaled-up version of an initial shape of the precursor $12_x^*$. Thus, in this example, a three-dimensional configuration of the initial shape of the precursor $12_x^*$ is such that, once the expandable material 50 is expanded, a three-dimensional configuration of the expanded shape of the post-molded expandable component $12_x$ imparts a three-dimensional configuration of the pad $36_x$ (e.g., including curved and/or angular parts of the pad $36_x$).

The post-molded expandable component $12_x$ of the helmet 10 constituting the pad $36_x$ is "expandable" in that it is capable of expanding and/or has been expanded by a substantial degree in response to a stimulus after being molded. That is, an expansion ratio of the post-molded expandable component $12_x$ of the helmet 10 constituting the pad $36_x$, which refers to a ratio of a volume of the post-molded expandable component $12_x$ of the helmet 10 after the expandable material 50 has been expanded subsequently to having been molded into the precursor $12_x^*$ over a volume of the precursor $12_x^*$ into which the expandable material 50 is initially molded, may be significantly high. For example, in some embodiments, the expansion ratio of the post-molded expandable component $12_x$ of the helmet 10 constituting the pad $36_x$ may be at least 2, in some cases at least 3, in some cases at least 5, in some cases at least 10, in some cases at least 20, in some cases at least 30, in some cases at least 40 and in some cases even more (e.g., 45).

The expandable material 50 can be any material capable of expanding after being molded. In this embodiment, the expandable material 50 includes a mixture of a polymeric substance 52 and an expansion agent 54 that allows the expandable material 50 to expand. Once expanded into its final shape, the pad $36_x$ may have desirable properties, such as being more shock-absorbent than it if had been made entirely of the expansion agent 54 and/or being lighter than if it had been made entirely of the polymeric substance 52.

The polymeric substance 52 constitutes a substantial part of the expandable material 50 and substantially contributes to structural integrity to the pad $36_x$. For instance, in some embodiments, the polymeric substance 52 may constitute at least 40%, in some cases at least 50%, in some cases at least 60%, in some cases at least 70%, in some cases at least 80%, and in some cases at least 90% of the expandable material 50 by weight. In this example of implementation, the polymeric substance 52 may constitute between 50% and 90% of the expandable material 50 by weight.

In this embodiment, the polymeric substance 52 may be an elastomeric substance. For instance, the polymeric substance 52 may be a thermoplastic elastomer (TPE) or a thermoset elastomer (TSE).

More particularly, in this embodiment, the polymeric substance 52 comprises polyurethane. The polyurethane 52 may be composed of any suitable constituents such as isocyanates and polyols and possibly additives. For instance, in some embodiments, the polyurethane 52 may have a hardness in a scale of Shore 00, Shore A, Shore C or Shore D, or equivalent. For example, in some embodiments, the hardness of the polyurethane 52 may be between Shore 5A and 95A or between Shore D 40D to 93D. Any other suitable polyurethane may be used in other embodiments.

The polymeric substance 52 may comprise any other suitable polymer in other embodiments. For example, in some embodiments, the polymeric substance 52 may comprise silicon, rubber, etc.

The expansion agent 54 is combined with the polyurethane 52 to enable expansion of the expandable material 50 to its final shape after it has been molded. A quantity of the expansion agent 54 allows the expandable material 50 to expand by a substantial degree after being molded. For instance, in some embodiments, the expansion agent 54 may constitute at least 10%, in some cases at least 20%, in some cases at least 30%, in some cases at least 40%, in some cases at least 50%, and in some cases at least 60%, of the expandable material 50 by weight and in some cases even more. In this example of implementation, the expansion agent 54 may constitute between 15% and 50% of the expandable material 50 by weight. Controlling the quantity of the expansion agent 54 may allow control of the expansion ratio of the post-molded expandable component $12_x$.

Figure 19:
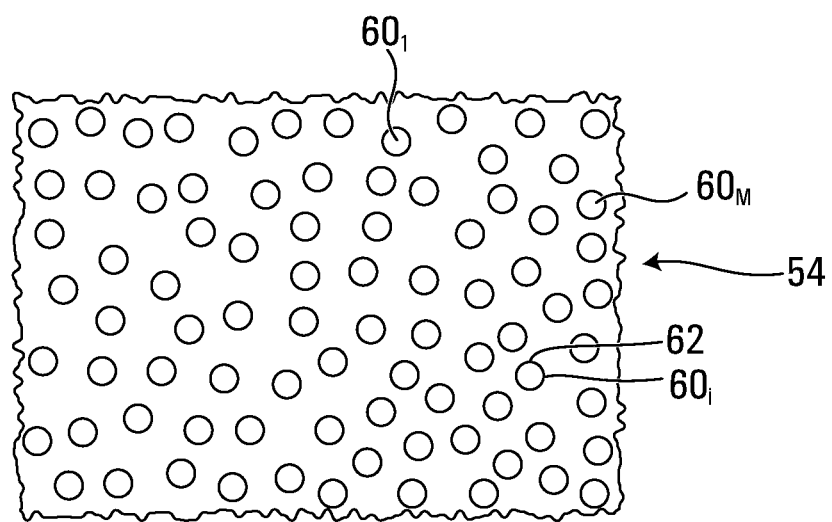
FIG. 19 shows an example of an expansion agent of the expandable material of the post-molded expandable component.

In this embodiment, as shown in FIG. 19, the expansion agent 54 comprises an amount of expandable microspheres $60_1$-$60_M$. Each expandable microsphere $60_i$ comprises a polymeric shell 62 expandable by a fluid encapsulated in an interior of the polymeric shell 62. In this example of implementation, the polymeric shell 62 of the expandable microsphere $60_i$ is a thermoplastic shell. The fluid encapsulated in the polymeric shell 62 is a liquid or gas (in this case a gas) able to expand the expandable microsphere $60_i$ when heated during manufacturing of the pad $36_x$. In some embodiments, the expandable microspheres $60_1$-$60_M$ may be Expancel™ microspheres commercialized by Akzo Nobel. In other embodiments, the expandable microspheres $60_1$-$60_M$ may be Dualite microspheres commercialized by Henkel; Advancell microspheres commercialized by Sekisui; Matsumoto Microsphere microspheres commercialized by Matsumoto Yushi Seiyaku Co; or KUREHA Microsphere microspheres commercialized by Kureha. Various other types of expandable microspheres may be used in other embodiments.

In this example of implementation, the expandable microspheres $60_1$-$60_M$ include dry unexpanded (DU) microspheres when combined with the polymeric substance 52 to create the expandable material 50 before the expandable material 50 is molded and subsequently expanded. For instance, the dry unexpanded (DU) microspheres may be provided as a powder mixed with one or more liquid constituents of the polymeric substance 52.

The expandable microspheres $60_1$-$60_M$ may be provided in various other forms in other embodiments. For example, in some embodiments, the expandable microspheres $60_1$-$60_M$ may include dry expanded, wet and/or partially-expanded microspheres. For instance, wet unexpanded microspheres may be used to get better bonding with the polymeric substance 52. Partially-expanded microspheres may be used to employ less of the polymeric substance 52, mix with the polymeric substance 52 in semi-solid form, or reduce energy to be subsequently provided for expansion.

In some embodiments, the expandable microspheres $60_1$-$60_M$ may constitute at least 10%, in some cases at least 20%, in some cases at least 30%, in some cases at least 40%, in some cases at least 50%, and in some cases at least 60% of the expandable material 50 by weight and in some cases even more. In this example of implementation, the expandable microspheres $60_1$-$60_M$ may constitute between 15% and 50% of the expandable material 50 by weight.

The post-molded expandable component $12_x$ of the helmet 10 constituting the pad $36_x$ may have various desirable qualities.

For instance, in some embodiments, the pad $36_x$ may be less dense and thus lighter than if it was entirely made of the polyurethane 52, yet be more shock-absorbent and/or have other better mechanical properties than if it was entirely made of the expandable microspheres $60_1$-$60_M$.

For example, in some embodiments, a density of the expandable material 50 of the pad $36_x$ may be less than a density of the polyurethane 52 (alone). For instance, the density of the expandable material 50 of the pad $36_x$ may be no more than 70%, in some cases no more than 60%, in some cases no more than 50%, in some cases no more than 40%, in some cases no more than 30%, in some cases no more than 20%, in some cases no more than 10%, and in some cases no more than 5% of the density of the polyurethane 52 and in some cases even less. For example, in some embodiments, the density of the expandable material 50 of the pad $36_x$ may be between 2 to 75 times less than the density of the polyurethane 52, i.e., the density of the expandable material 50 of the pad $36_x$ may be about 1% to 50% of the density of the polyurethane 52).

The density of the expandable material 50 of the pad $36_x$ may have any suitable value. For instance, in some embodiments, the density of the expandable material 50 of the pad $36_x$ may be no more than 0.7 g/cm$^3$, in some cases no more than 0.4 g/cm$^3$, in some cases no more than 0.1 g/cm$^3$, in some cases no more than 0.080 g/cm$^3$, in some cases no more than 0.050 g/cm3, in some cases no more than 0.030 g/cm$^3$, and/or may be at least 0.010 g/cm$^3$. In some examples of implementation, the density of the expandable material 50 may be between 0.015 g/cm$^3$ and 0.080 g/cm$^3$, in some cases between 0.030 g/cm$^3$ and 0.070 g/cm$^3$, and in some cases between 0.040 g/cm$^3$ and 0.060 g/cm$^3$.

As another example, in some embodiments, a stiffness of the expandable material 50 of the pad $36_x$ may be different from (i.e., greater or less than) a stiffness of the expandable microspheres $60_1$-$60_M$ (alone). For instance, a modulus of elasticity (i.e., Young's modulus) of the expandable material 50 of the pad $36_x$ may be greater or less than a modulus of elasticity of the expandable microspheres $60_1$-$60_M$ (alone). For instance, a difference between the modulus of elasticity of the expandable material 50 of the pad $36_x$ and the modulus of elasticity of the expandable microspheres $60_1$-$60_M$ may be at least 20%, in some cases at least 30%, in some cases at least 50%, and in some cases even more, measured based on a smaller one of the modulus of elasticity of the expandable material 50 of the pad $36_x$ and the modulus of elasticity of the expandable microspheres $60_1$-$60_M$. In some cases, the modulus of elasticity may be evaluated according to ASTM D-638 or ASTM D-412.

As another example, in some embodiments, a resilience of the expandable material 50 of the pad $36_x$ may be less than a resilience of the expandable microspheres $60_1$-$60_M$ (alone). For instance, in some embodiments, the resilience of the expandable material 50 of the pad $36_x$ may be no more than 70%, in some cases no more than 60%, in some cases no more than 50%, in some cases no more than 40%, in some cases no more than 30%, in some cases no more than 20%, and in some cases no more than 10% of the resilience of the expandable microspheres $60_1$-$60_M$ according to ASTM D2632-01 which measures resilience by vertical rebound. In some examples of implementation, the resilience of the expandable material 50 of the pad $36_x$ may be between 20% and 60% of the resilience of the expandable microspheres $60_1$-$60_M$. Alternatively, in other embodiments, the resilience of the expandable material 50 of the pad $36_x$ may be greater than the resilience of the expandable microspheres $60_1$-$60_M$.

The resilience of the expandable material 50 of the pad $36_x$ may have any suitable value. For instance, in some embodiments, the resilience of the expandable material 50 of the pad $36_x$ may be no more than 40%, in some cases no more than 30%, in some cases no more than 20%, in some cases no more than 10% and in some cases even less (e.g., 5%), according to ASTM D2632-01, thereby making the pad $36_x$ more shock-absorbent. In other embodiments, the resilience of the expandable material 50 of the pad $36_x$ may be at least 60%, in some cases at least 70%, in some cases at least 80% and in some cases even more, according to ASTM D2632-01, thereby making the expandable material 50 provide more rebound (e.g., which may be useful in other embodiments where the post-molded expandable component $12_x$ is part of other devices, as discussed later).

As another example, in some embodiments, a tensile strength of the expandable material 50 of the pad $36_x$ may be greater than a tensile strength of the expandable microspheres $60_1$-$60_M$ (alone). For instance, in some embodiments, the tensile strength of the expandable material 50 of the pad $36_x$ may be at least 120%, in some cases at least 150%, in some cases at least 200%, in some cases at least 300%, in some cases at least 400%, and in some cases at least 500% of the tensile strength of the expandable microspheres $60_1$-$60_M$ according to ASTM D-638 or ASTM D-412, and in some cases even more.

The tensile strength of the expandable material 50 of the pad $36_x$ may have any suitable value. For instance, in some embodiments, the tensile strength of the expandable material 50 of the pad $36_x$ may be at least 0.9 MPa, in some cases at least 1 MPa, in some cases at least 1.2 MPa, in some cases at least 1.5 MPa and in some cases even more (e.g. 2 MPa or more).

As another example, in some embodiments, an elongation at break of the expandable material 50 of the pad $36_x$ may be greater than an elongation at break of the expandable microspheres $60_1$-$60_M$ (alone). For instance, in some embodiments, the elongation at break of the expandable material 50 of the pad $36_x$ may be at least 120%, in some cases at least 150%, in some cases at least 200%, in some cases at least 300%, in some cases at least 400%, and in some cases at least 500% of the elongation at break of the expandable microspheres $60_1$-$60_M$ according to ASTM D-638 or ASTM D-412, and in some cases even more.

The elongation at break of the expandable material 50 of the pad $36_x$ may have any suitable value. For instance, in some embodiments, the elongation at break of the expandable material 50 of the pad $36_x$ may be at least 20%, in some cases at least 30%, in some cases at least 50%, in some cases at least 75%, in some cases at least 100%, and in some cases even more (e.g. 150% or more).

Figure 20:
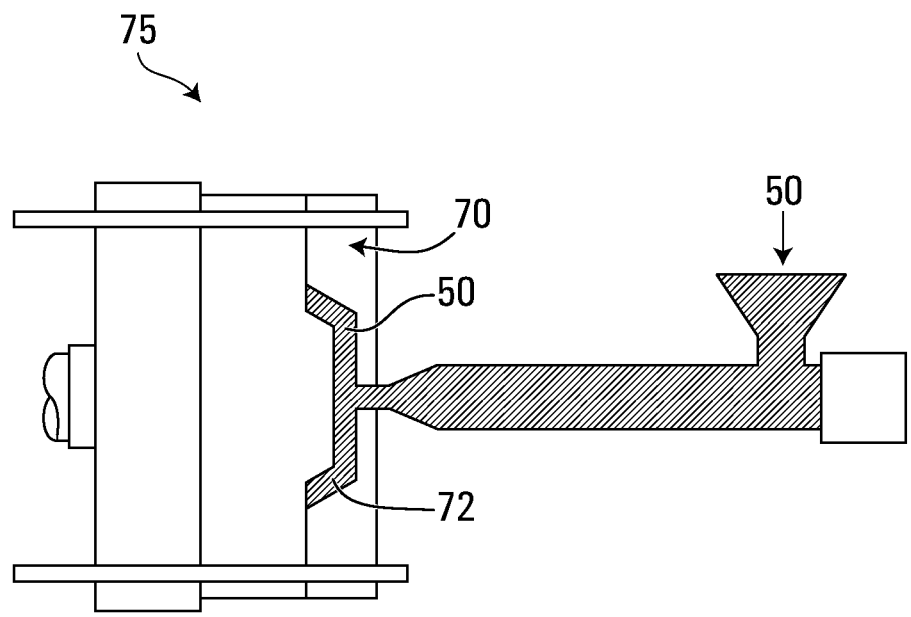
FIG. 20 shows an example of a molding apparatus for molding the precursor of the post-molded expandable component.

With additional reference to FIG. 20, in this embodiment, the post-molded expandable component $12_x$ constituting the pad $36_x$ of the helmet 10 may be manufactured by: providing the expandable material 50; molding the expandable material 50 into the precursor $12_x$* in a mold 70; and expanding the expandable material 50 to the expanded shape which is the scaled-up version of the initial shape of the precursor $12_x$* and which corresponds to the three-dimensional configuration of the post-molded expandable component $12_x$, by subjecting the precursor $12_x$* made of the expanded material 50 to a stimulus (e.g., heat) after the precursor $12_x$* has been molded (e.g., outside of the mold 70). That is, expansion of the precursor $12_x$* made of the expanded material 50 to the expanded shape of the post-molded expandable component $12_x$ is caused by energy transmitted to the precursor $12_x$* made of the expanded material 50 after the precursor $12_x$* has been molded (e.g., outside of the mold 70).

The expandable material 50 may be provided in any suitable way and any suitable molding process using the mold 70 may be used to mold the expandable material 50 into the precursor $12_x$*.

In this embodiment, the expandable material 50 is provided as a fluid flowing into the mold 70 to undergo the molding process to mold the expandable material 50 into the precursor $12_x$*. In particular, in order to obtain the expandable material 50, the expandable microspheres $60_1$-$60_M$ are combined with the polyurethane 52. For instance, the expandable microspheres $60_1$-$60_M$ may be introduced into one or more components of the polyurethane 52 prior to mixing of the components of the polyurethane 52 (e.g., isocyanates and/or polyols). For example, in this embodiment, the expandable microspheres $60_1$-$60_M$ are introduced into the isocyanates of the polyurethane 52 prior to mixing the isocyanates, the polyols and any other components of the polyurethane 52 if any. This may allow the isocyanates to react to the moisture present in the expandable microspheres $60_1$-$60_M$. The expandable microspheres $60_1$-$60_M$ may be introduced into the polyols of the polyurethane 52 in other embodiments. Moreover, in this example, the expandable microspheres $60_1$-$60_M$ are introduced into the polyurethane 52 as dry unexpanded microspheres.

Also, in this embodiment, the molding process of the precursor $12_x$* is a low-temperature molding process during which a temperature of the expandable material 50 being molded is lower than an expansion temperature at which the expandable microspheres $60_1$-$60_M$ are expanded. For instance, in some embodiments where the expansion temperature of the expandable microspheres $60_1$-$60_M$ may be 70° C. or more, the molding process may be carried out such that the temperature of the expandable material 50 being molded is less than 70° C. (e.g., 40° C.).

In this example, the molding process of the precursor $12_x$* is also done at low pressure such that it is a low-temperature and low-pressure molding process. This may be done since expansion of the expandable material 50 occurs after it has been molded (e.g., outside of the mold 70).

More particularly, in this embodiment, the molding process of the precursor $12_x$* is injection molding. For instance, in this embodiment, the molding process is carried out via a molding apparatus 75 comprising the mold 70. In this example, the molding process includes feeding the expandable material 50 into a barrel of the molding apparatus 75 (e.g., via a hopper) in which a mechanism (e.g., a screw mechanism) causes displacement of the expandable material 50 towards a sprue of the mold 70. Once the expandable material 50 reaches the sprue of the mold 70, the expandable material 50 is injected into a mold cavity 72 of the mold 70 that is shaped like the precursor $12_x$*. After the expandable material 50 has shaped into it, the precursor $12_x$* is removed from the mold 70. One or more finishing operations may be carried out in order to produce the finished precursor $12_x$* (e.g., deflashing).

In some cases, the molding process of the precursor $12_x$* may use one or more inserts (e.g., cores) which are disposed within the mold 70 prior to forming the precursor $12_x$* and which are configured to form empty spaces within the precursor $12_x$* (e.g., vents). Such inserts may comprise a material having a low melting temperature. For example, the material of the inserts may comprise wax, expanded polyethylene (EPE), expanded polystyrene (EPS), or any other suitable material.

Since in this embodiment the molding process is a low-temperature and low-pressure injection molding process, production of the mold 70 may be less expensive and safer than if a high-temperature and/or high-pressure injection molding process was implemented. Moreover, this may result in an overall lowered stress condition in the precursor $12_x$*.

The mold 70 in which the expandable material 50 is molded may be provided in any suitable way in various embodiments.

For example, in this embodiment, the mold 70 may be created by additive manufacturing, a.k.a., 3D printing, such as selective laser sintering (SLS), stereolithography (SLA), etc. This may be facilitated since the mold 70 may be relatively small, given that the expandable material 50 will be expanded after being molded in the mold 70.

Figure 21:
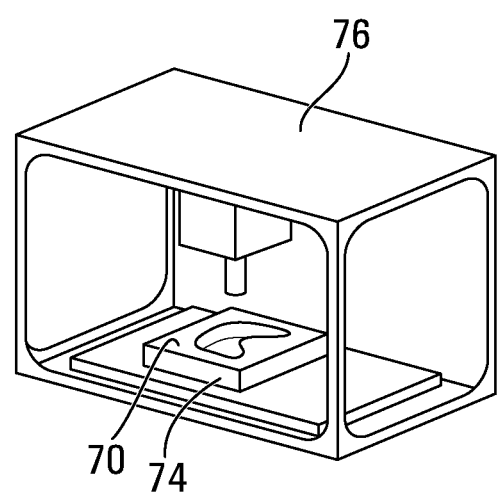
FIG. 21 shows an example of a 3D printer for printing a mold used for molding the precursor of the post-molded expandable component.

More particularly, in this embodiment, as shown in FIG. 21, the mold 70 is made by a 3D printer 76. The 3D printer 76 is configured to form a three-dimensional object based at least in part on a design file (e.g., a CAD file) that is generated on a computing apparatus (e.g., a desktop computer, a laptop, a tablet, a smartphone, etc.). To that end, the 3D printer 76 deposits layers of material on top of one another in order to form the three-dimensional object. For instance, the 3D printer 76 may generally include a printer head (e.g., an extruder) that is movable along two or more axes (e.g., an x-axis and a z-axis) and a printer bed that may be stationary or movable along one or more axes (e.g., a y-axis). The 3D printer 76 may be configured in various other ways in other embodiments (e.g., having components movable along a polar coordinate system).

Thus, in this embodiment, the mold 70 comprises a printed material 74 that is layered by the 3D printer 76 in order to form the mold 70. In this embodiment, the printed material 74 of the mold 70 is a polymeric material, and more specifically, a polyurethane material. The printed material 74 of the mold 70 may comprise any other suitable polymeric material in other embodiments (e.g., silicon, polycarbonate, etc.). Moreover, in some embodiments, the printed material 74 of the mold 70 may comprise a metallic material or a ceramic material.

In embodiments where the mold 70 is made via SLS, a material of the mold 70 may comprise a powdered material. For example, the material of the mold 70 may comprise a metallic powdered material or a polymeric powdered material. Alternatively, in embodiments where the mold 70 is made via SLA, the material of the mold 70 may comprise a polymeric resin.

Making the mold 70 via the 3D printer 76 (i.e., via additive manufacturing) may decrease a cost of making the mold 70 (e.g., by reducing the amount of time needed to manufacture the mold 70) and therefore lead to a decrease in a production cost of the post-molded expandable component 12$_x$. Moreover, using the 3D printer 76 to make the mold 70 may facilitate producing custom designs of the post-molded expandable component 12$_x$.

Figure 39:
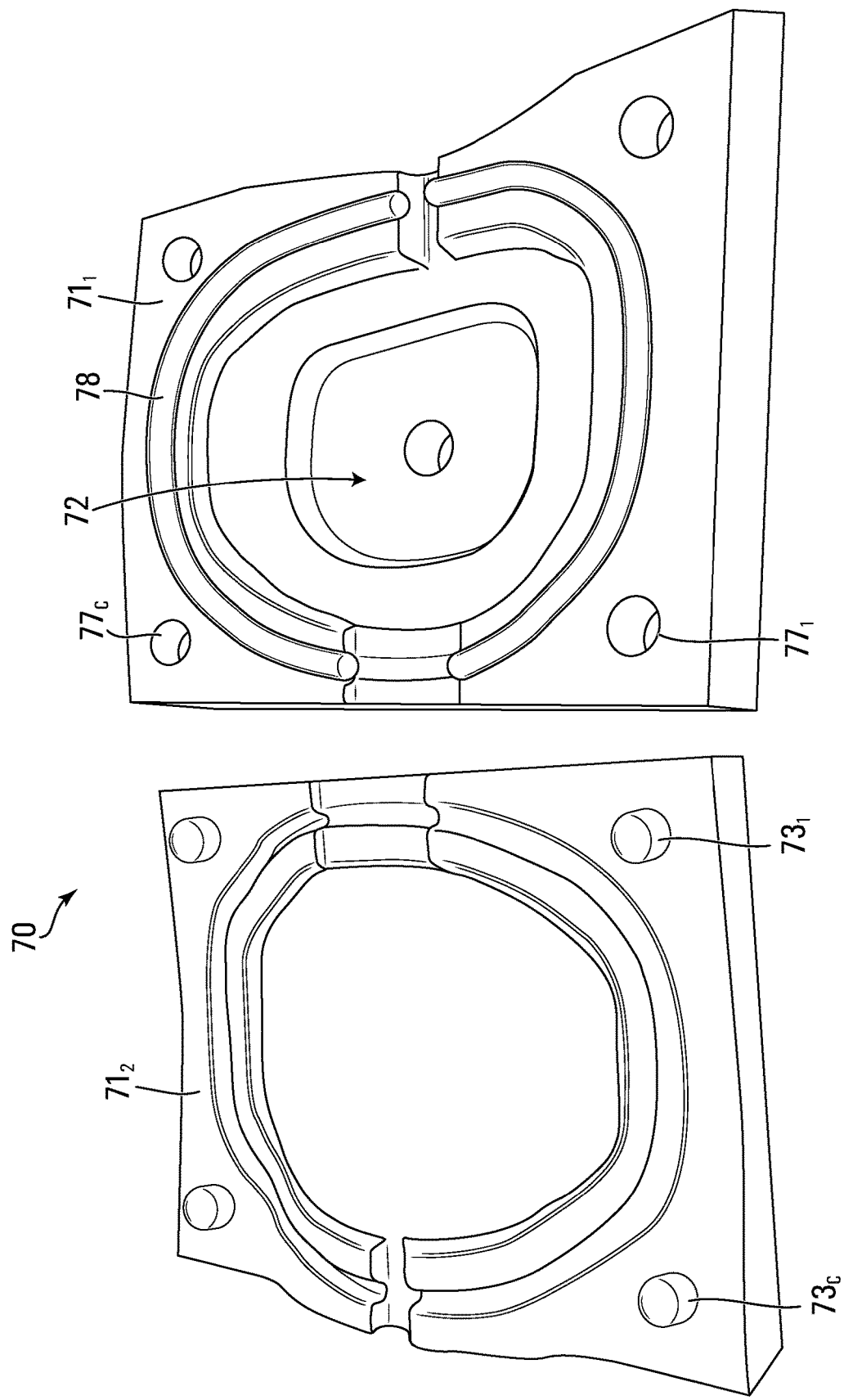
FIG. 39 shows an example of a configuration of the mold used to form the precursor.

The mold 70 may be configured in any suitable way. For instance, an example of configuration of the mold 70 is shown in FIG. 39. In this example, the mold 70 comprises first and second mold halves 71$_1$, 71$_2$ which are complimentary to one another. For example, the first mold half 71$_1$ may comprise a plurality of first connectors 73$_1$-73$_C$ (e.g., protrusions, ridges, etc.) that are configured to fit a plurality of second connectors 77$_1$-77$_C$ (e.g., recesses, holes, etc.) of the second mold half 71$_2$ to correctly position the first mold half 71$_1$ relative to the second mold half 71$_2$ and to secure the two mold halves 71$_1$, 71$_2$ together. The mold 70 may also comprise a sealing member 78 (e.g., a gasket) to prevent or otherwise minimize loss of the material to be molded in the mold 70 during molding. The mold cavity 72 of the mold 70 is formed when the first and second mold halves 71$_1$, 71$_2$ are secured to one another. In this example, the material of the mold 70 comprises silicone. The material of the mold 70 may comprise any other suitable material in other examples.

The mold 70 in which the expandable material 50 is molded may be made in any other suitable manner in other embodiments.

Figure 40:
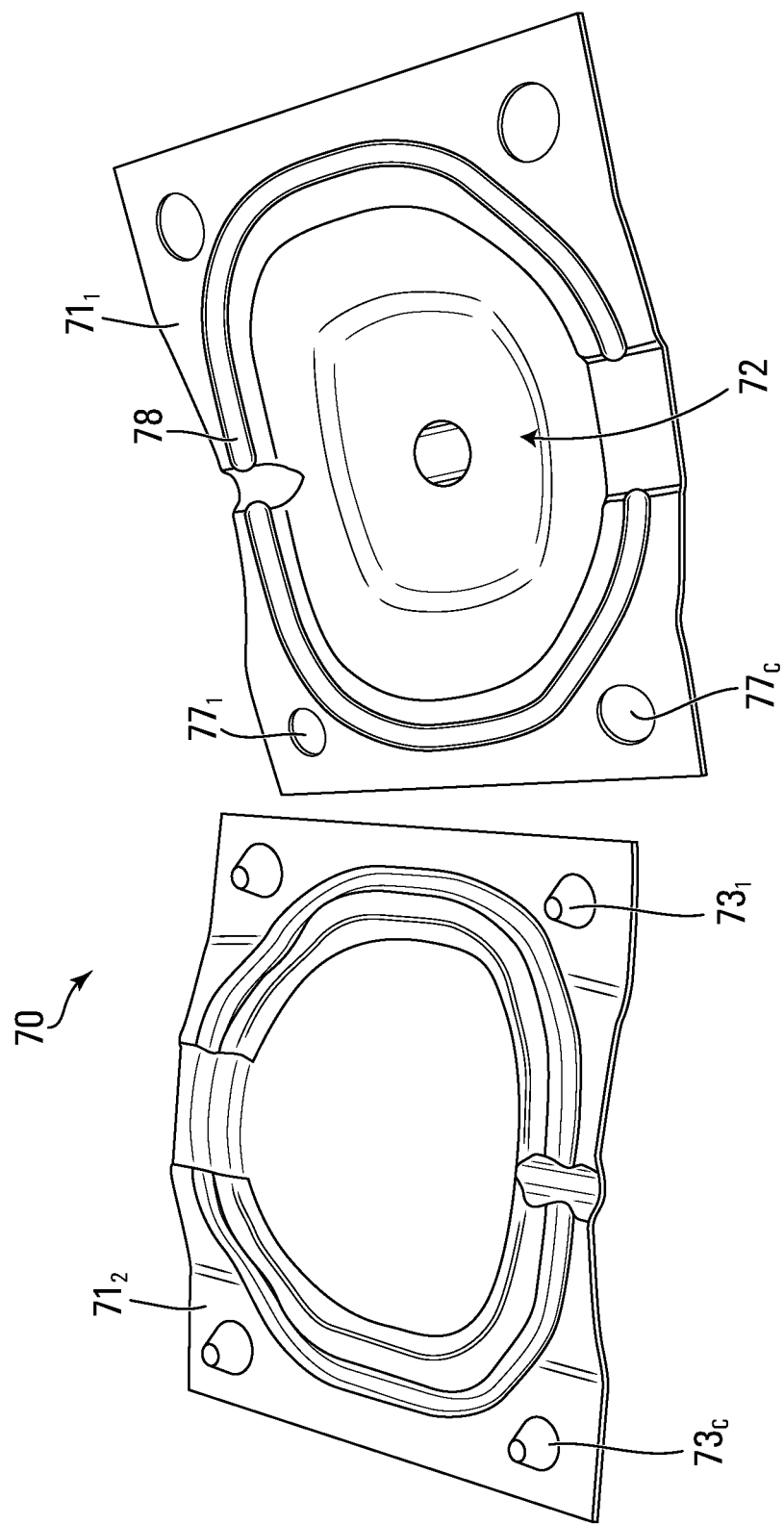
FIG. 40 shows an example of the mold when it is thermoformed.
Figure 41:
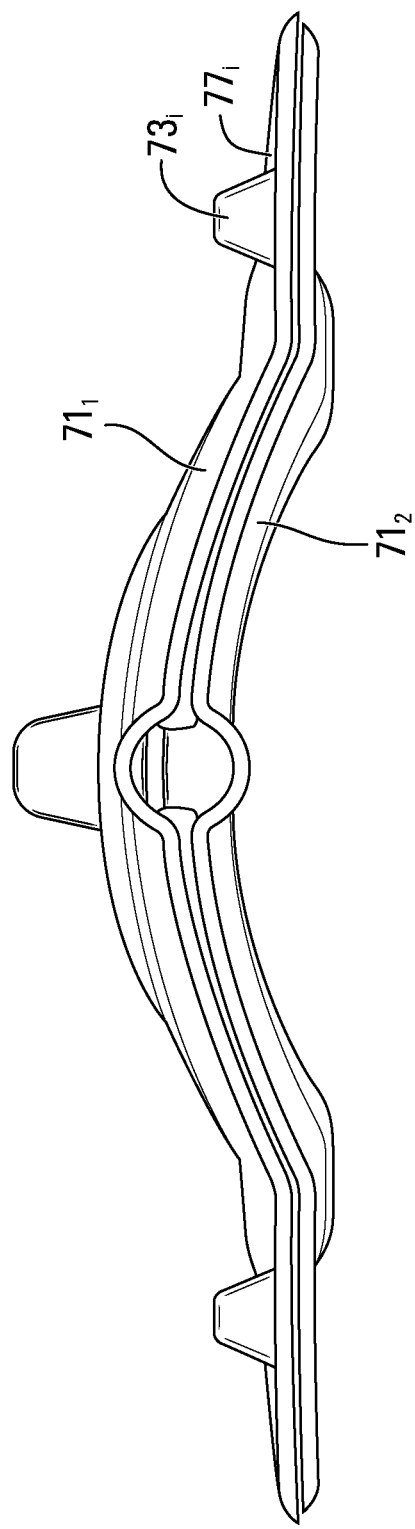
FIG. 41 shows a top view of the mold of FIG. 40 when two halves of the mold are assembled.
Figure 42A:
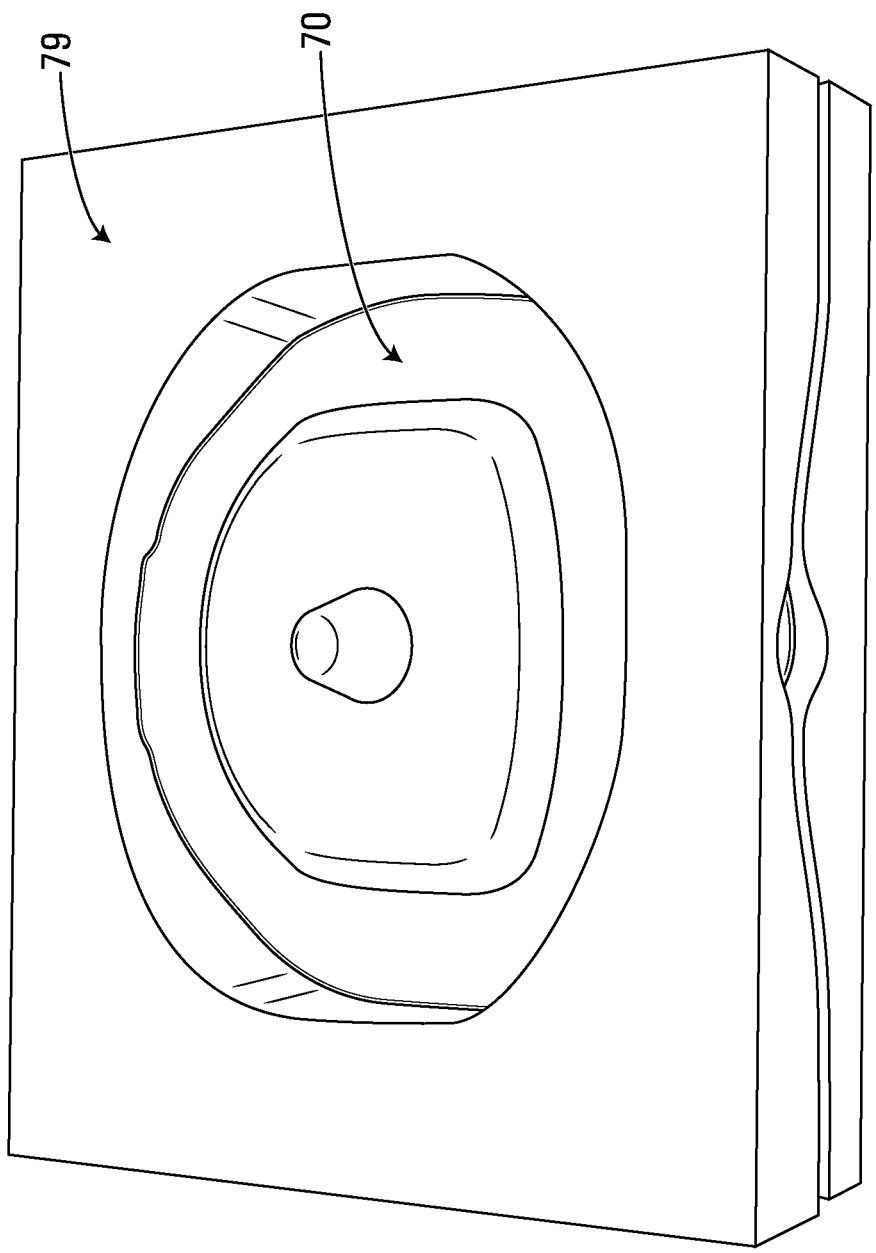
FIGS. 42A and 42B show an example of a compression device used for forming the precursor with the mold of FIGS. 40 and 41.
Figure 42B:
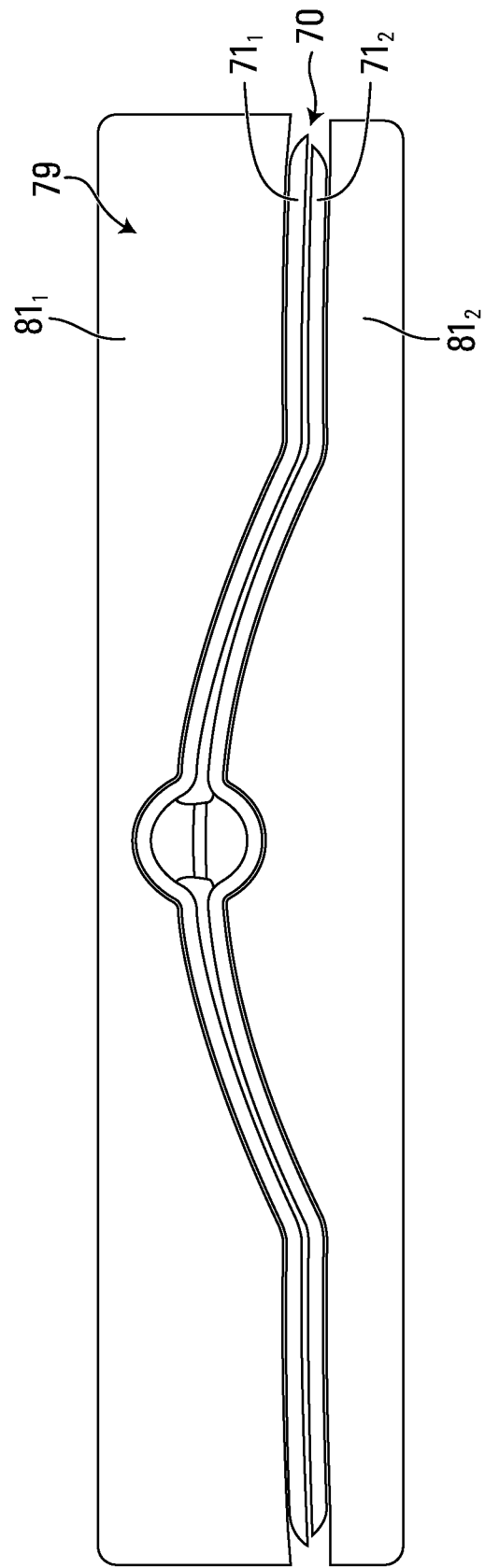

For instance, in some embodiments, the mold 70 may be thermoformed. An example of the mold 70 that is thermoformed is shown in FIGS. 40 and 41. In this example, each of the first and second mold halves 71$_1$, 71$_2$ of the mold 70 consists of a thermoformed sheet comprising a thermoformable material. That is, each of the first and second mold halves 71$_1$, 71$_2$ is originally a sheet of thermoformable material that is heated and subsequently deformed to acquire its final shape. As shown in FIGS. 42A and 42B, a compression device 79 may be provided when molding the precursor 12$_x$* with the thermoformed mold 70 in order to compress the sealing member 78 during molding (e.g., injection molding). The compression device 79 may comprise first and second members 81$_1$, 81$_2$ being disposed on top and below the mold 70 such as to sandwich the first and second mold halves 71$_1$, 71$_2$ at a peripheral portion of the first and second mold halves 71$_1$, 71$_2$. An opening may be provided on one or both members 81$_1$, 81$_2$ of the compression device 79 to allow a certain amount of deformation of the mold 70 at a location of the mold cavity 72.

As the expandable material 50 molded into the precursor 12$_x$* will be subsequently expanded, in this embodiment, the mold 70 may effectively be used to manufacture post-molded expandable components like the post-molded expandable component 12$_x$ that have different sizes (i.e., by controlling expansion of the expandable material 50 after it has been molded).

Figure 22:
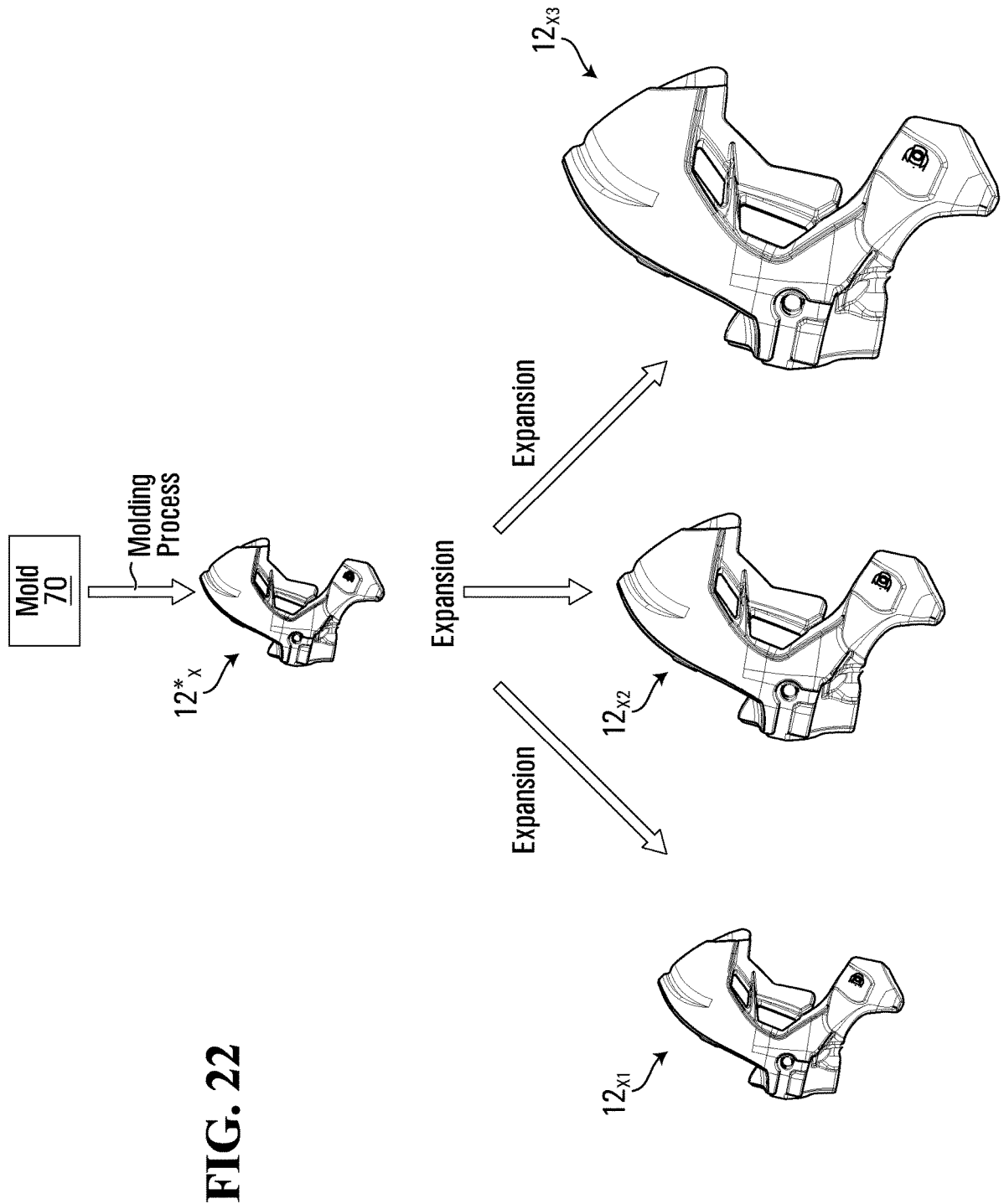
FIG. 22 is a flow diagram showing the mold being used to produce the precursor which can be expanded into different sizes of the post-molded expandable component.

For example, in this embodiment, with additional reference to FIG. 22, the mold 70 is used to produce the precursor 12$_x$* which may be expanded into a post-molded expandable component of a first size 12$_{x1}$ (e.g., a small size), a post-molded expandable component of a second size 12$_{x2}$ (e.g., a medium size), or a post-molded expandable component of a third size 12$_{x3}$ (e.g., a large size). The precursor 12$_x$* may be expanded into more sizes in other embodiments (e.g., a junior size, an extra-large size). As such, a single mold 70 may allow manufacturing post-molded expandable components 12$_1$-12$_E$ of various sizes.

Upon having been molded into the precursor 12$_x$* in the mold 70, the expandable material 50 is subsequently subjected to a stimulus which causes it to expand into its expanded shape that is the scaled-up version of the initial shape of the precursor 12$_x$* and that corresponds to the three-dimensional configuration of the post-molded expandable component 12$_x$ constituting the pad 36$_x$ of the helmet 10.

In this embodiment, there may be a substantial amount of time after molding of the expandable material 50 into the precursor 12$_x$* in the mold 70 and before expansion of the expandable material 50 into its expanded shape that is the scaled-up version of the initial shape of the precursor 12$_x$* and that corresponds to the three-dimensional configuration of the pad 36$_x$, which will be referred to as a substantial "post-molding pre-expansion amount of time". The stimulus causing expansion of the expandable material 50 may thus be initiated after the substantial post-molding pre-expansion amount of time following molding of the precursor 12$_x$* in the mold 70.

The substantial post-molding pre-expansion amount of time may allow the properties of the expandable material 50 in its expanded shape to be enhanced, including its stiffness, resilience, and tensile strength, as discussed above. More particularly, during the substantial post-molding pre-expansion amount of time, the expandable material 50 of the precursor 12$_x$* may undergo a chemical reaction (e.g., polymerization) or other reaction that can enhance its properties, such as its stiffness, resilience, and tensile strength, compared to if it had been instantly or rapidly expanded upon being molded in the mold 70.

For example, in some embodiments, the substantial post-molding pre-expansion amount of time for the expandable material 50 of the precursor $12_x^*$ may be at least one hour, in some cases at least ten hours, in some cases at least one day, in some cases at least two days, in some cases at least three days, in some cases at least five days, in some cases at least seven days, and in some cases even more.

In this embodiment, expansion of the expandable material 50 of the precursor $12_x^*$ into the three-dimensional configuration of the pad $36_x$ in response to the stimulus occurs outside of the mold 70 in which the precursor $12_x^*$. That is, upon having been molded into the precursor $12_x^*$ in the mold 70, the expandable material 50 is removed from the mold 70 and then subjected to the stimulus which causes it to expand.

Figure 23:
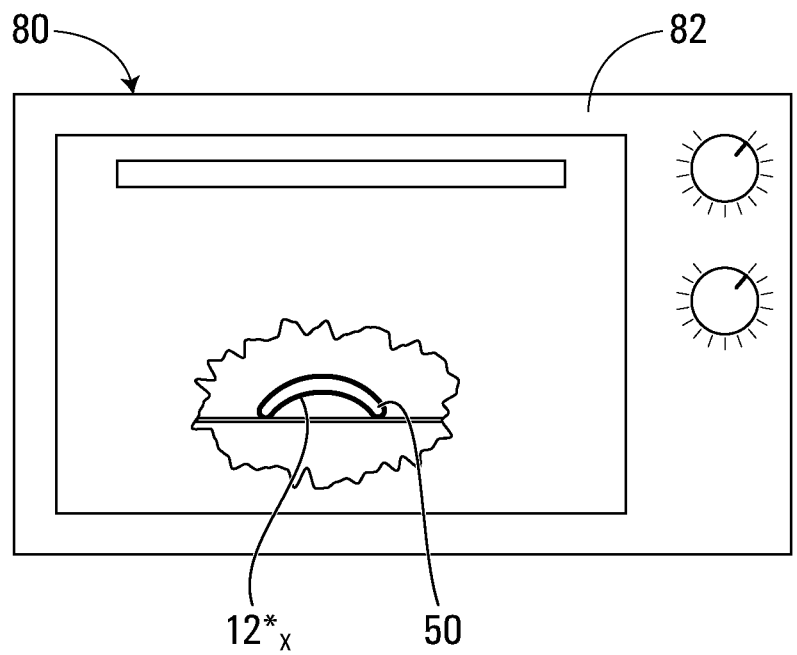
FIG. 23 shows an oven that subjects the expandable material to heat in order to expand the precursor to form the post-molded expandable component.

The stimulus causing expansion of the expandable material 50 is energy transmitted to the expandable material 50 causing its expansion. In this embodiment, heat is the stimulus causing expansion of the expandable material 50. More particularly, in this embodiment, the expandable material 50 is subjected to heat generated by a heat source 80 which causes the expandable material 50 of the precursor $12_x^*$ to expand into the post-molded expandable component $12_x$. In this embodiment, as shown in FIG. 23, the heat source 80 comprises an oven 82 comprising a thermally-insulated chamber and at least one heating element disposed within the thermally insulated chamber. In this example, the oven 82 is powered electrically, however the oven 82 may be powered in any suitable way in other examples (e.g., a gas-powered oven). Moreover, the oven 82 may be any suitable type of oven such as, for example, an industrial oven, a conventional oven, or a microwave oven. In other embodiments, the heat source 80 may be a hot liquid (e.g., the precursor $12_x^*$ may be subject to a hot liquid bath) or a hot gas (e.g., hot air expulsed by a blower).

The oven 82 is configured to generate heat such as to attain and maintain a given temperature within its insulated chamber. In this example, the given temperature is set by a user of the oven 82 (e.g., via a control) to cause the precursor $12_x^*$ to be heated such that the expandable material 50 reaches its expansion temperature at which the expandable microspheres $60_1$-$60_M$ of the expandable material 50 expand. The expansion temperature of the expandable material 50, and thus of the precursor $12_x^*$, may vary. For instance, in some cases, the expansion temperature of the precursor $12_x^*$ may be at least 70° C., in some cases at least 90° C., in some cases at least 110° C., in some cases at least 130° C., in some cases at least 150° C. and in some cases even more (e.g., 160° C.).

In order to cause the expandable material 50 of the precursor $12_x^*$ to expand to its expanded shape corresponding to the three-dimensional configuration of the pad $36_x$, the expansion temperature of the precursor $12_x^*$ is held for a given amount of time. The given amount of time may be referred to as an "expansion time" of the precursor $12_x^*$ since it is the time it takes for the expandable material 50 of the precursor $12_x^*$ to expand into the post-molded expandable component $12_x$. The expansion time of the precursor $12_x^*$ may vary. For instance, in some cases, the expansion time of the precursor may be at least 10 seconds, in some cases at least 1 minute, in some cases at least 5 minutes, in some case at least 10 minutes, in some cases at least 20 minutes, in some cases at least 30 minutes, in some cases at least 40 minutes, and in some cases even more (e.g., 60 minutes).

By controlling the expansion temperature, the expansion time and the quantity of the expandable microspheres $60_1$-$60_M$ of the precursor $12_x^*$, an operator of the oven 82 is able to control the expansion ratio of the post-molded expandable component $12_x$ and thus the size of the post-molded expandable component $12_x$ constituting the pad $36_x$. In other words, by controlling the expansion temperature, the expansion time and the quantity of the expandable microspheres $60_1$-$60_M$ of the precursor $12_x^*$, the operator can produce the post-molded expandable component $12_x$ constituting the pad $36_x$ in accordance to various sizes (e.g., small, medium, large sizes).

Expansion of the expandable material 50 into the post-molded expandable component $12_x$ of the helmet 10 constituting the pad $36_x$ may be performed by any suitable entity.

In this embodiment, expansion of the expandable material 50 into the post-molded expandable component $12_x$ of the helmet 10 constituting the pad $36_x$ may be performed by a manufacturer of the helmet 10 during original manufacturing of the helmet 10. For instance, the manufacturer of the helmet 10 may use the molding apparatus 75 and the mold 70 as described above to make the precursor $12_x^*$ and thereafter subject the precursor $12_x^*$ to heat generated by the heat source 80 (e.g., the oven 82) in order to cause the expandable material 50 of the precursor $12_x^*$ to expand to form the post-molded expandable component $12_x$. As such, in this embodiment, the manufacturer of the helmet 10 is able to make different sizes of the pad $36_x$ for different sizes of the helmet 10 by using the mold 70.

The post-molded expandable component $12_x$ of the helmet 10 constituting the pad $36_x$ may be implemented in any other suitable way in other embodiments.

Figure 43:
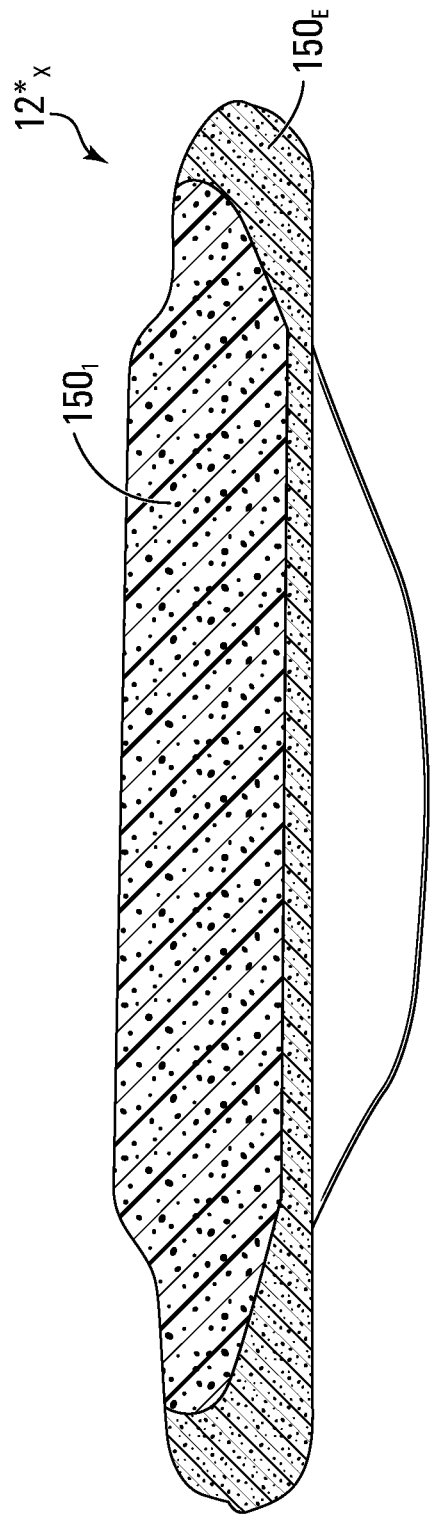
FIG. 43 shows an example of a variant in which the post-molded expandable component comprises a plurality of expandable materials.

For instance, in some embodiments, as shown in FIG. 43, the expandable material 50 of the post-molded expandable component $12_x$ may be one of a plurality of expandable materials $150_1$-$150_E$ of the post-molded expandable component $12_x$ that have different properties from one another.

For example, in some cases, a given expandable material $150_i$ of the post-molded expandable component $12_x$ may have a greater expansion ratio than another expandable material $150_k$ of the post-molded expandable component $12_x$. As such the given expandable material $150_i$ may expand more than the other expandable material $150_k$ when subjected to a similar stimulus.

In some examples, a given expandable material $150_i$ of the post-molded expandable component $12_x$ may have a different stiffness, hardness or density than another expandable material $150_k$. This may impart different mechanical properties at different regions of the post-molded expandable component $150_k$. For instance, an expandable material $150_i$ that is more outwardly disposed than another expandable material $150_k$ (i.e., being more spaced apart from the player's head at a portion or an entirety of the post-molded expandable component $12_x$) may have a greater stiffness than the other expandable material $150_k$. For example, the expandable material $150_i$ that is more outwardly disposed than the other expandable material $150_k$ may have a greater stiffness to protect the player's head from an impact while the other expandable material $150_k$ that is more inwardly disposed may have a smaller stiffness so as to be more comfortable on the player's head.

The plurality of expandable materials $150_1$-$150_E$ of the post-molded expandable component $12_x$ may be formed via a multi-injection molding process in which the plurality of expandable materials $150_1$-$150_E$ are molded subsequently using a same molding apparatus. This may be done by loading two or more different feeders of the molding apparatus with the expandable materials $150_1$-$150_E$ in order to inject the expandable materials $150_1$-$150_E$ into each mold cavity of a mold. The mold is movable within the molding apparatus (e.g., rotatable) to bring each mold cavity into its "fill position" for each expandable material $150_i$. A similar multi-part casting process may be performed to form the plurality of expandable materials $150_1$-$150_E$.

Figure 45:
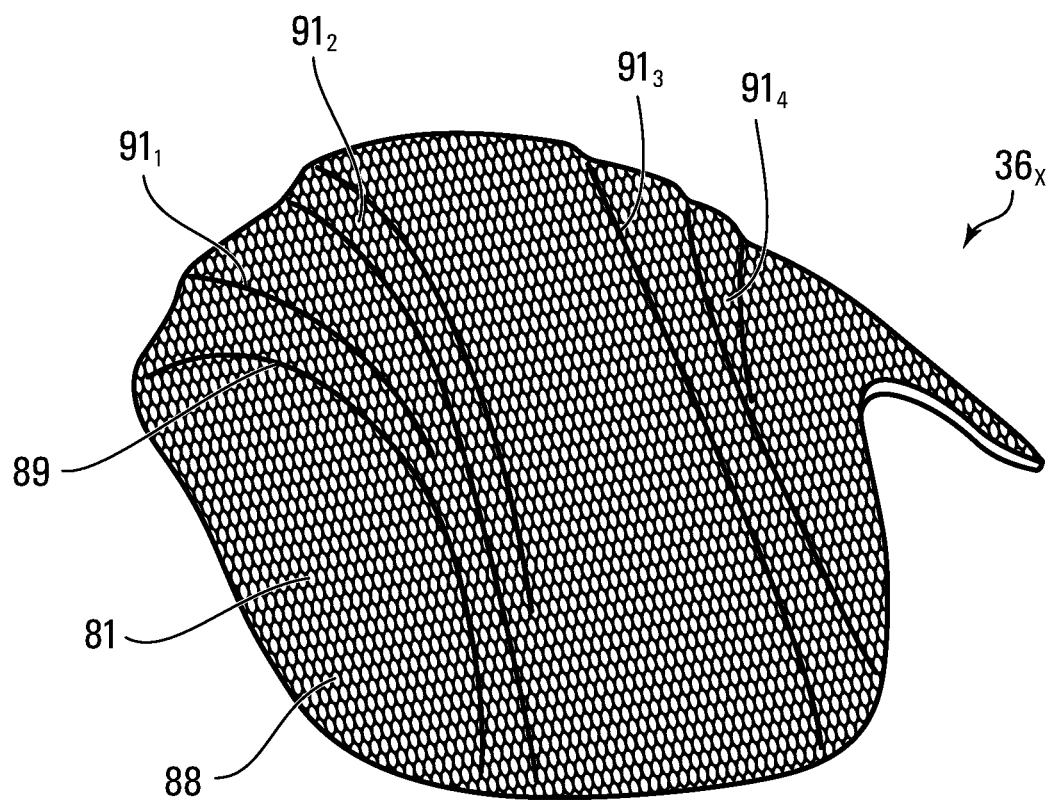
FIG. 45 shows an example of a variant in which a pad comprising the post-molded expandable component comprises a decorative outer layer constituting at least part of an outer surface of the pad.

As another example, in some embodiments, as shown in FIG. 45, the pad $36_x$ may comprise a decorative outer layer 81 constituting at least part of an outer surface 88 of the pad $36_x$. The decorative outer layer 81 is colored differently than (i.e., includes one or more colors different from that of) the expandable material 50 of the pad $36_x$. In some examples, the decorative outer layer 81 may include a graphical representation of: one or more alphanumeric characters that may form text (e.g., a word, a message, etc.); one or more symbols (e.g., a logo, a sign, an emblem, etc.); one or more shapes or patterns; and/or one or more real or imaginary objects (e.g., a person, an animal, a vehicle, an imaginary or fictional character, or any other real or imaginary thing).

The decorative outer layer 81 may be implemented in any suitable way. For instance, in some embodiments, the decorative outer layer 81 may comprise: a coating, such as a dye, paint (e.g., applied by spraying, dipping, etc.); a print (e.g., a direct printing, a pad printing, sublimation); a laser engraving; a sheet, such as a film; etc., or any combination thereof.

In some embodiments, the decorative outer layer 81 may be part of the pad $36_x$ before expansion of the expandable material 50 of the pad $36_x$, such that the decorative outer layer 81 expands with the expandable material 50 when subjected to the stimulus (e.g., heat) after molding. For example, in some embodiments, the expandable material 50 and the decorative outer layer 81 may be implemented by different expandable materials $150_1$-$150_E$ as discussed above. In some cases, the decorative outer layer 81 may be applied onto an internal surface of the mold 70 so as to form the outer surface 88 of the precursor 12x* during molding.

In other embodiments, the decorative outer layer 81 may be provided after expansion of the expandable material 50 of the pad $36_x$. For instance, in some examples, the decorative outer layer 81 may be affixed (e.g., adhesively or chemically bonded) to the expandable material 50 after the expandable material 50 has been expanded.

Alternatively or additionally, in some embodiments, the outer surface 88 of the pad $36_x$ may comprise a molded texture 89 imparted during molding of the precursor $12_x$*, i.e., during molding of the expandable material 50 or an outer one of the expandable materials $150_1$-$150_E$, where applicable. The molded texture 89 comprises a predetermined arrangement of relief elements $91_1$-$91_5$ (i.e., one or more recesses and/or one or more projections) of the outer surface 88 of the pad $36_x$. The relief elements $91_1$-$91_5$ are present in the precursor $12_x$* as they are created by the mold 70 and then expanded during expansion of the expandable material 50 or the outer one of the expandable materials $150_1$-$150_E$, where applicable.

Figure 24:
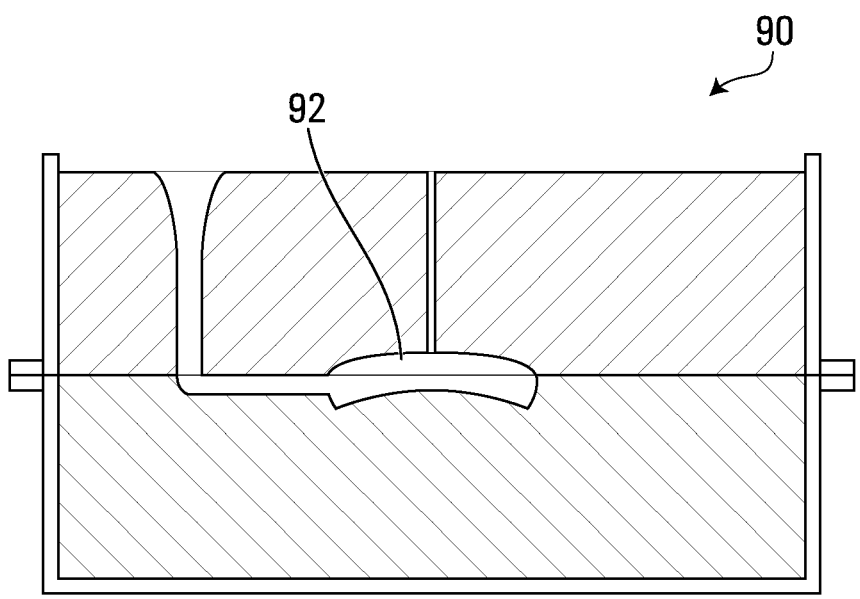
FIG. 24 shows an example of a variant in which the precursor is cast.

As another example, in a variant, with additional reference to FIG. 24, the molding process of the precursor $12_x$* may be casting. The casting process of the precursor $12_x$* involves molding the expandable material 50 in a mold 90 configured to produce the precursor $12_x$*. More specifically, the casting process involves pouring the expandable material 50, in a fluid state, into the mold 90 via a sprue thereof in order to fill a mold cavity 92 of the mold 90 that has the shape of the precursor $12_x$*. Once the expandable material 50 has cured within the mold cavity 92, the precursor $12_x$* is formed and can be removed from the mold 90. Additional finishing processes may be carried out on the precursor $12_x$* (e.g., deflashing).

While FIG. 24 illustrates the mold 90 configured in a certain way, the mold 90 may be configured in any suitable way in other embodiments. For instance, the mold 90 may comprise additional features (e.g., a pouring cup, runners, gates, etc.).

In another variant, the molding process of the precursor $12_x$* may be thermoforming. For instance, the expandable material 50 may be provided as a thermoformable sheet 94 that is thermoformed in order to produce the precursor $12_x$* from which the post-molded expandable component $12_x$ may be formed by expansion.

In this example, with additional reference to FIGS. 25A and 25B, an extrusion mechanism 96 (e.g., a sheet extruder) is used to produce the thermoformable sheet 94.

More specifically, the expandable material 50 is fed into the extrusion mechanism 96 (e.g., via a hopper) and circulated through a barrel of the extrusion mechanism 96. In some cases, the barrel may be heated to soften or liquefy the expandable material 50 in order to facilitate its deformation as it is manipulated by the extrusion mechanism 96. The expandable material 50 is then fed into a die of the extrusion mechanism 96 that forms the expandable material 50 into a sheet which is subsequently passed between a pair of rollers of the extrusion mechanism 96 in order to reduce a thickness of the sheet. In some embodiments, as shown in FIG. 25B, the sheet thickness may instead be reduced by passing the sheet through a scraper of the extrusion mechanism 96 (e.g., supported on a conveyor mechanism). The extrusion mechanism 96 may also comprise a cutting subassembly (e.g., a slitter, a guillotine, etc.) for partitioning the extruded sheet into multiple thermoformable sheets 94 of a desired size. The extrusion process may be performed below the expansion temperature of the expandable material 50.

The extrusion mechanism 96 may be configured in any other suitable way. For instance, the extrusion mechanism 96 may comprise additional components (e.g., a breaker plate) that are not shown. Moreover, the thermoformable sheet 94 may be formed in any other suitable way in other examples.

Figure 26:
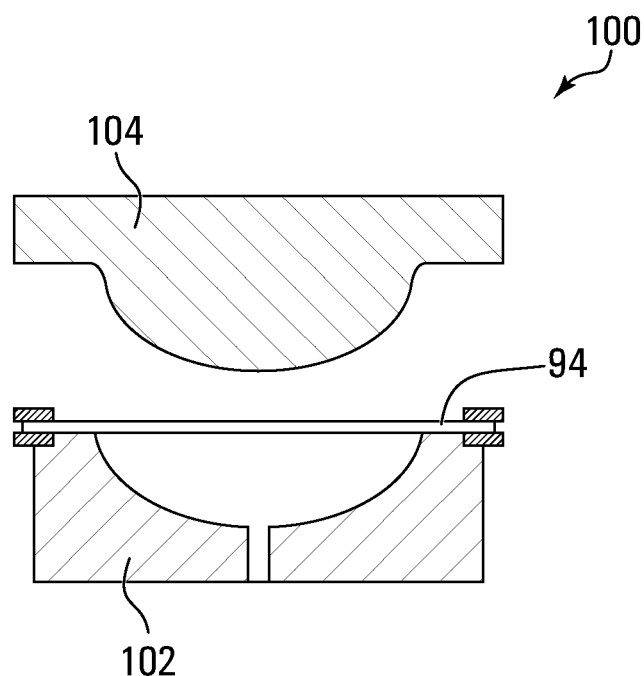
FIGS. 26 and 27 show an example of a thermoforming process for molding the thermoformable sheet to form the precursor.
Figure 27:
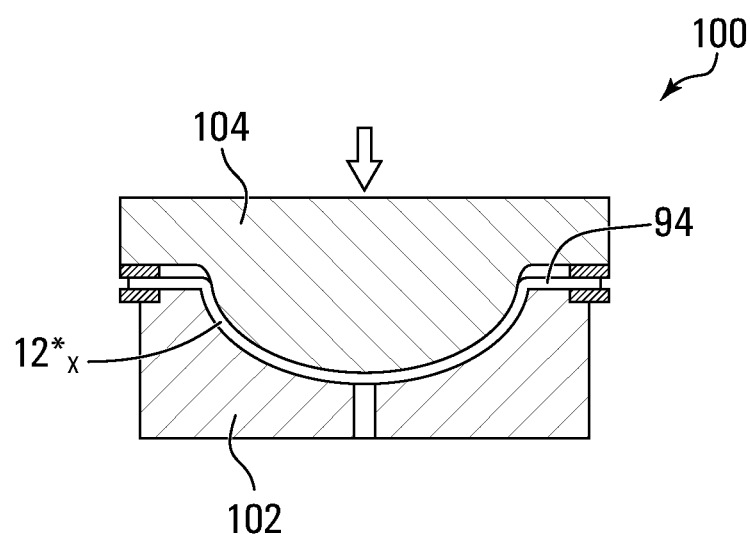

With additional reference to FIGS. 26 and 27, the thermoforming process of the precursor $12_x$* is performed using a molding apparatus 100. In this example, the molding apparatus 100 comprises a negative mold 102 and a positive mold 104 that is shaped complementarily to the negative mold 102. As shown in FIG. 26, in order to begin the thermoforming process, the thermoformable sheet 94 is heated and placed on top of the negative mold 102. As shown in FIG. 27, the positive mold 104 is then pressed onto the negative mold 102 such as to sandwich the thermoformable sheet 94 between the positive mold 104 and the negative mold 102, thus causing the thermoformable sheet 94 to acquire the shape of the negative and positive molds 102, 104. Once the thermoformable sheet 94 has cured, the positive mold 104 is disengaged from the negative mold 102 and the formed precursor $12_x$* is removed therefrom.

Additional finishing processes may be carried out on the precursor $12_x$* (e.g., deflashing).

The molding apparatus 100 may be configured in any other suitable way. For instance, in some examples, the thermoforming process may be a vacuum thermoforming process or any other suitable thermoforming process, In a variant, in some embodiments, the stimulus for expanding the expandable material 50 may be any other suitable stimulus (e.g., microwave, ultraviolet (UV) light, etc.).

Figure 44:
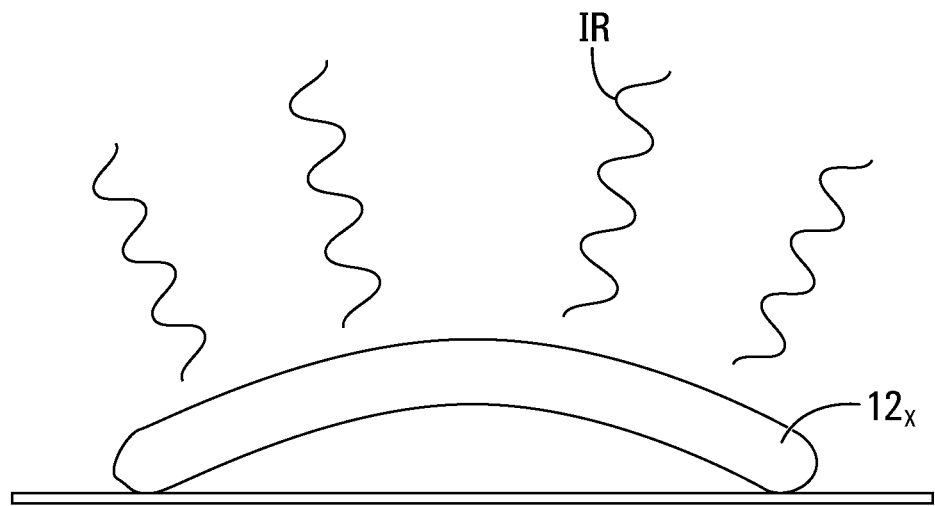
FIG. 44 shows an example of a variant in which the expandable material of the post-molded expandable component is subjected to infrared light to cause the expandable material to expand.

For instance, with additional reference to FIG. 44, in one example, the expandable material 50 of the post-molded expandable component $12_x$ may be caused to expand by infrared light. That is, subjecting the expandable material 50 of the post-molded expandable component $12_x$ to infrared light IR of a given intensity for a given exposure time may cause the post-molded expandable component $12_x$ to expand. Thus by controlling the intensity and exposure time of the infrared light IR on the post-molded expandable component $12_x$, one may control the expansion of the expandable material 50 of the post-molded expandable component $12_x$. As another example, the expandable material 50 of the post-molded expandable component $12_x$ may be caused to expand by ultrasonic vibrations. For instance, subjecting the expandable material 50 of the post-molded expandable component $12_x$ to ultrasonic vibrations may cause molecules of the expandable material 50 to vibrate and thus generate heat. Thus, by controlling the intensity of the ultrasonic vibrations and an amount of time to which the expandable material 50 is subjected to the ultrasonic vibrations, one may control the expansion of the expandable material 50 of the post-molded expandable component $12_x$.

In a variant, in some embodiments, the expansion of the expandable material 50 into the post-molded expandable component $12_x$ of the helmet 10 constituting the pad $36_x$ may be performed by a retailer or other entity selling the helmet 10 to buyers such as the user after original manufacturing of the helmet 10.

For instance, the expansion of the expandable material 50 into the post-molded expandable component $12_x$ may be done instore (i.e., at the retailer's store/place of business) or otherwise at a location where buyers such as the player acquire helmets such as the helmet 10. To that end, in such an example, the retailer may have an oven such as the oven 82 described above installed instore in order to cause expansion of the expandable material 50 at the retailer's store. More specifically, the retailer may be responsible for placing the precursor $12_x$* in the oven 82 in order to subject the precursor $12_x$* to heat at the expansion temperature for a duration of the expansion time in accordance with a size desired by the retailer. This may allow the retailer to produce the post-molded expandable component $12_x$ in sizes desired by his/her customers on an individual basis.

Moreover, this may allow the retailer to provide custom-fit sized post-molded expandable components to buyers of the helmet 10. For instance, the precursor $12_x$* may be expanded by the retailer to conform to the player's head.

In another variant, in some embodiments, the expansion of the expandable material 50 into the post-molded expandable component $12_x$ of the helmet 10 constituting the pad $36_x$ may be performed by the user of the helmet 10 after original manufacturing of the helmet 10.

For instance, the expansion of the expandable material 50 into the post-molded expandable component $12_x$ may be done at home or another location of the user's preference. To that end, in such an example, the user may have an oven such as the oven 82 described above installed at his/her home in order to cause expansion of the precursor $12_x$*. In such a case, the oven 82 may be a standard kitchen oven. More specifically, the user may be responsible for placing the precursor $12_x$* in the oven 82 in order to subject the precursor $12_x$* to heat at the expansion temperature for a duration of the expansion time in accordance with a size desired by the user. This may allow the user to produce the post-molded expandable component $12_x$ in accordance to the size he/she desires. That is, the user may form a custom-fitted post-molded expandable component $12_x$ that is ideal for his/her size.

In such a variant, the helmet 10 may come with an instruction guide that instructs the user on how to cause the precursor $12_x$* to expand into the post-molded expandable component $12_x$. For instance, the instruction guide may include data establishing a relationship between a desired size of the post-molded expandable component $12_x$ (e.g., small, medium, large, etc.) and the expansion temperature and expansion time of the precursor $12_x$*. The user may therefore use this data to cause the expandable material 50 of the precursor $12_x$* to expand to a size of the post-molded expandable component $12_x$ that he/she desires in accordance with his/her own body measurements. In some cases, the data provided in the instruction guide may correlate one or more head dimensions (i.e., measurements of a head) to a given expansion temperature and given expansion time of the precursor $12_x$* that are recommended for expanding the expandable material 50 of the precursor $12_x$* into a size of the post-molded expandable component $12_x$ that is appropriate for the given one or more head dimensions. For example, the data provided by the instruction guide may relate a given head width, head length and/or head height or any other head dimension with an expansion temperature and an expansion time of the precursor $12_x$* that is expected to yield a post-molded expandable component $12_x$ of a size suitable to accommodate a head having said given head width, head length and/or head height or other head dimension.

Figure 28:
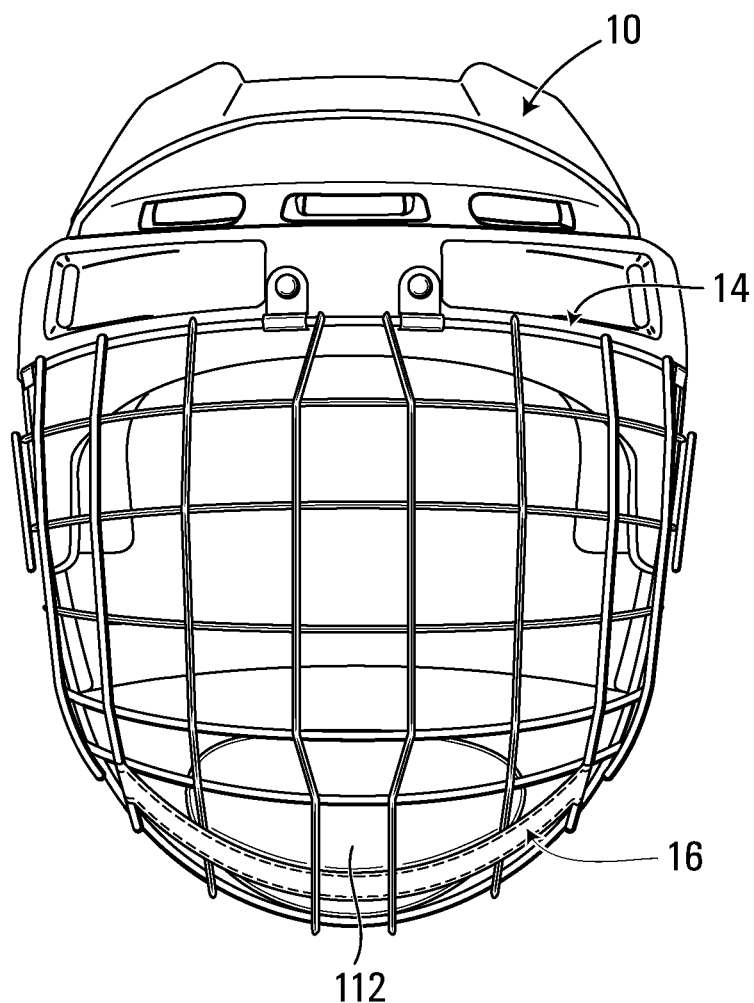
FIG. 28 shows an embodiment according to which the post-molded expandable component is comprised by a chin cup of the helmet.

While in this embodiment the inner liner 15 of the helmet 10 comprises the post-molded expandable components $12_1$-$12_E$, in other embodiments, another part of the helmet 10 may comprise one or more post-molded expandable components such as the post-molded expandable components $12_1$-$12_E$. For instance, in some embodiments, as shown in FIG. 28, when the helmet 10 comprises a faceguard 14, a chin cup 82 mounted to the chin strap 16 of the helmet 10 to engage a chin of the user may comprise a post-molded expandable component 112 constructed using principles described here in respect of the post-molded expandable components $12_1$-$12_E$. In some embodiments, at least part of the outer shell 11 may comprise a post-molded expandable component that is similar to the post-molded expandable components $12_1$-$12_E$. For instance, a given one of the front shell member 22 and the rear shell member 24 of the outer shell 11 may comprise a post-molded expandable component.

Although in this embodiment the article of protective athletic gear 10 is the helmet 10, in other embodiments, the article of protective athletic gear 10 may be any other article of protective athletic gear comprising one or more post-molded expandable components constructed using principles described herein in respect of the post-molded expandable components $12_1$-$12_E$.

Figure 29:
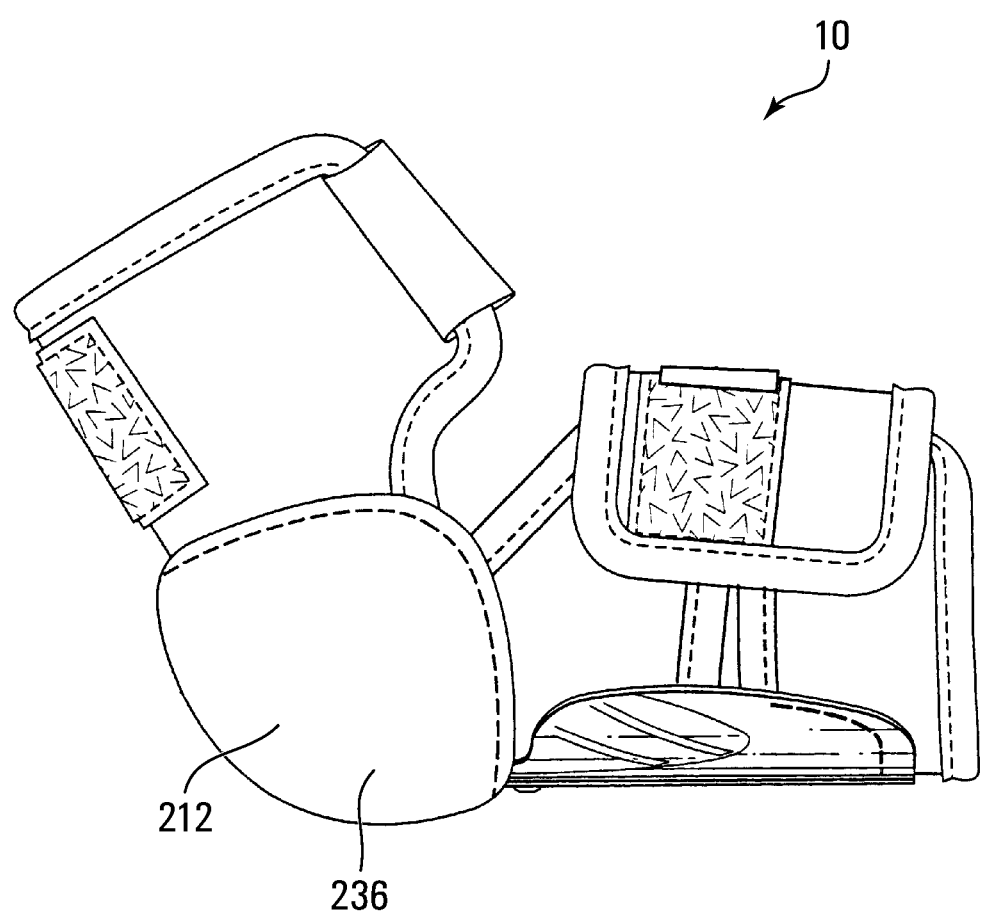
FIG. 29 show an embodiment in which the post-molded expandable component is comprised by an arm guard.

For example, in some embodiments, as shown in FIG. 29, the article of protective athletic gear 10 may be an arm guard (e.g., an elbow pad) for protecting an arm (e.g., an elbow) of a user, in which the arm guard 10 comprises a post-molded expandable component 212 constructed using principles described herein in respect of the post-molded expandable components $12_1$-$12_E$ and constituting a pad 236 of the arm guard 10.

Figure 30:
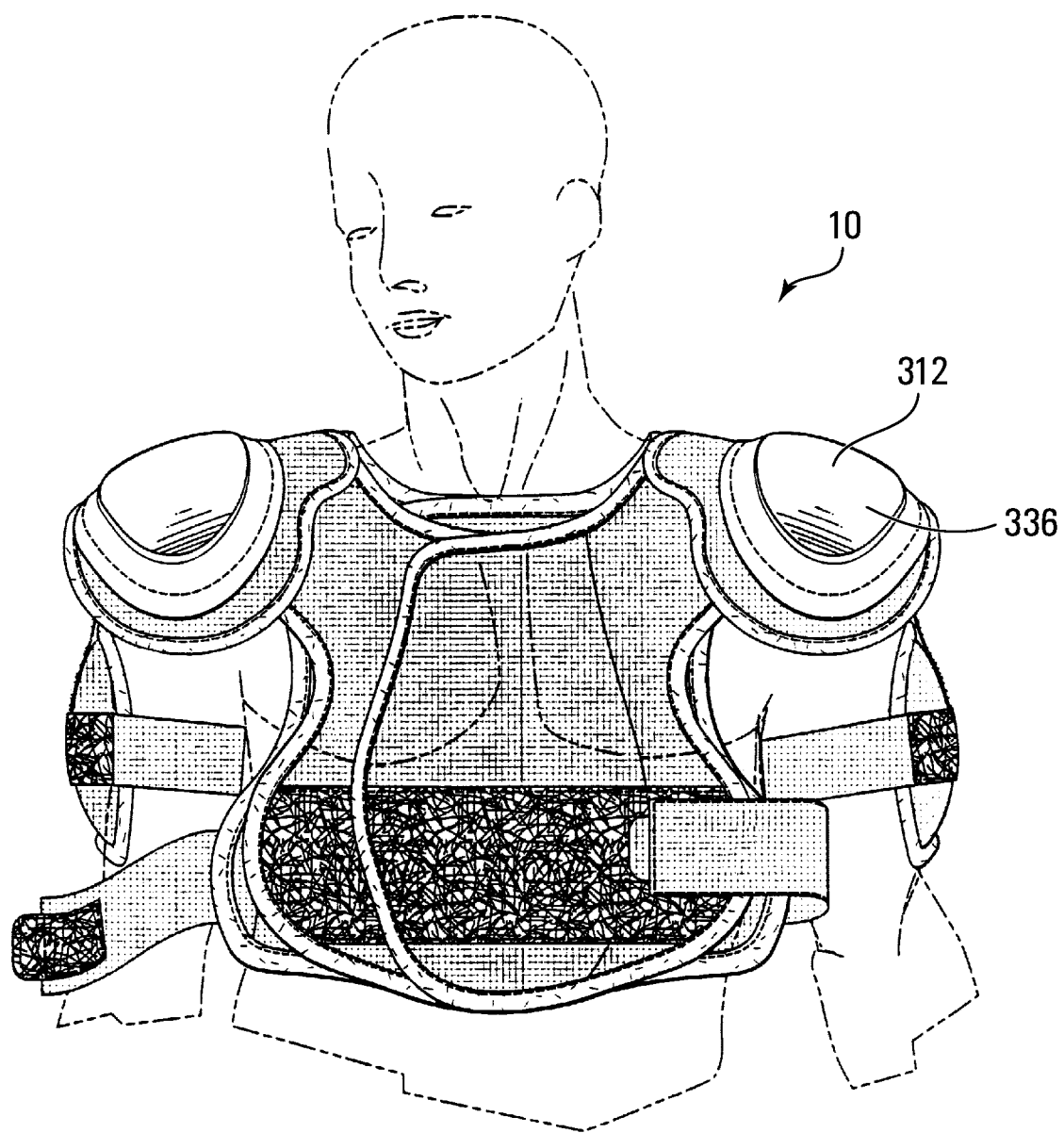
FIG. 30 shows an embodiment in which the post-molded expandable component is comprised by shoulder pads.

As another example, in some embodiments, as shown in FIG. 30, the article of protective athletic gear 10 may be shoulder pads for protecting an upper torso (e.g., shoulders and a chest) of a user, in which the shoulder pads 10 comprise a post-molded expandable component 312 constructed using principles described herein in respect of the post-molded expandable components $12_1$-$12_E$ and constituting a pad 336 of the shoulder pads 10.

Figure 31:
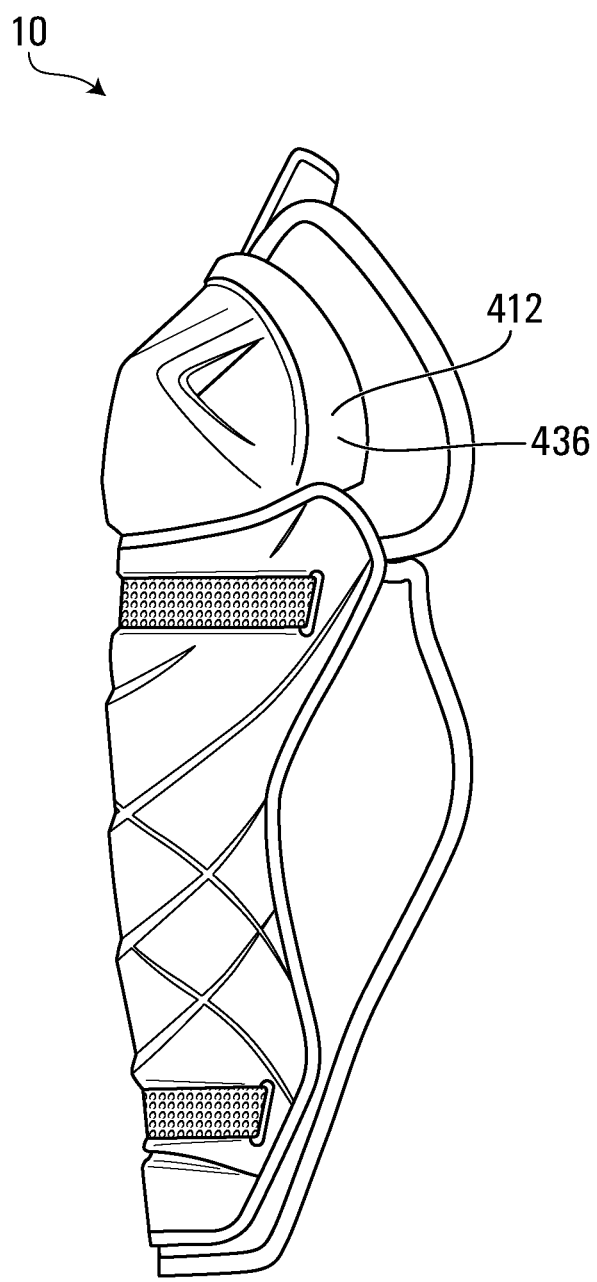
FIG. 31 shows an embodiment in which the post-molded expandable component is comprised by a leg guard.

As another example, in some embodiments, as shown in FIG. 31, the article of protective athletic gear 10 may be a leg guard for protecting a leg of a user, in which the leg guard 10 comprises a post-molded expandable component 412 constructed using principles described herein in respect of the post-molded expandable components $12_1$-$12_E$ and constituting a pad 436 of the leg guard 10.

Figure 32:
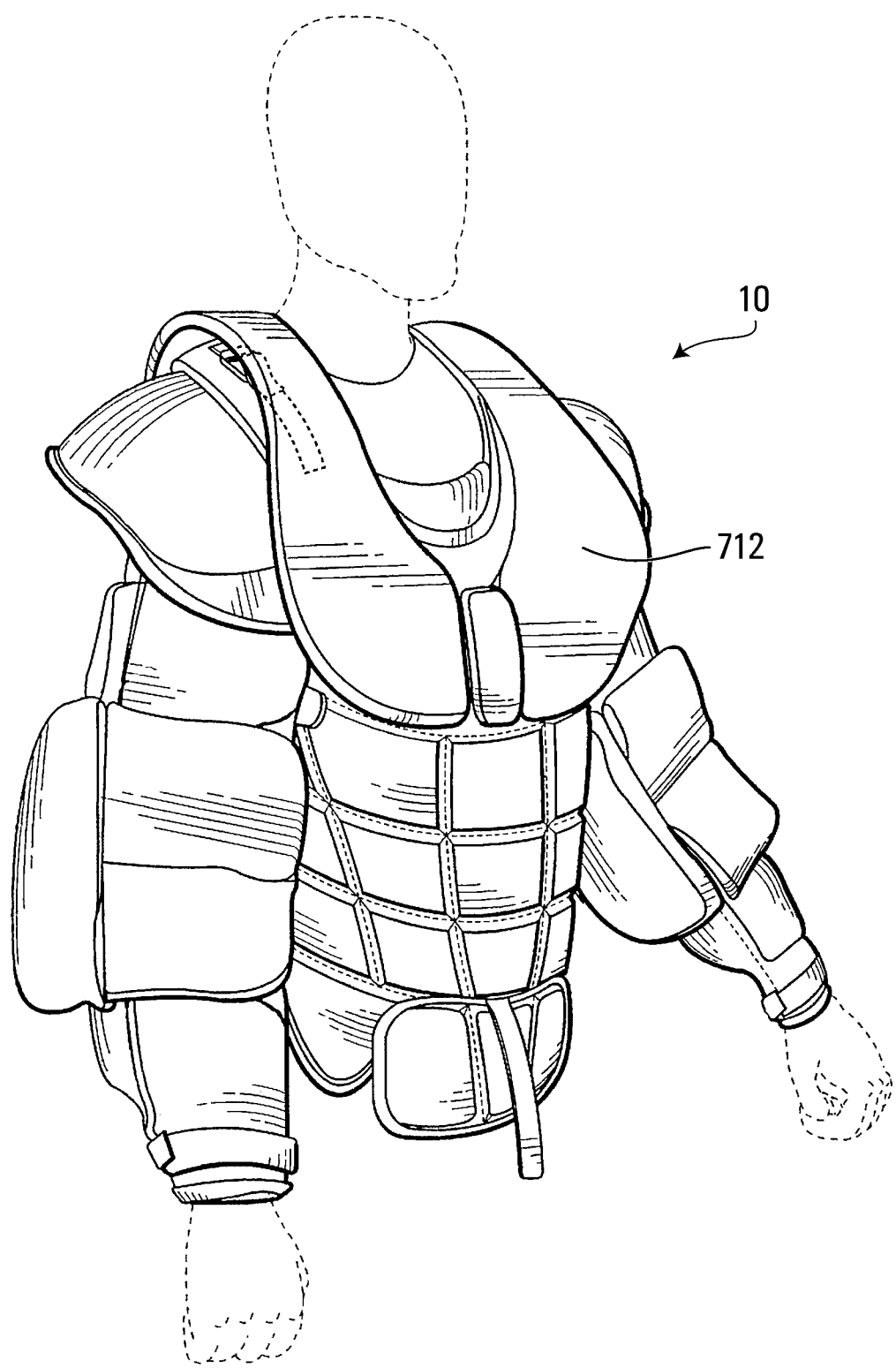
FIG. 32 shows an embodiment in which the post-molded expandable component is comprised by a chest protector.
Figure 33:
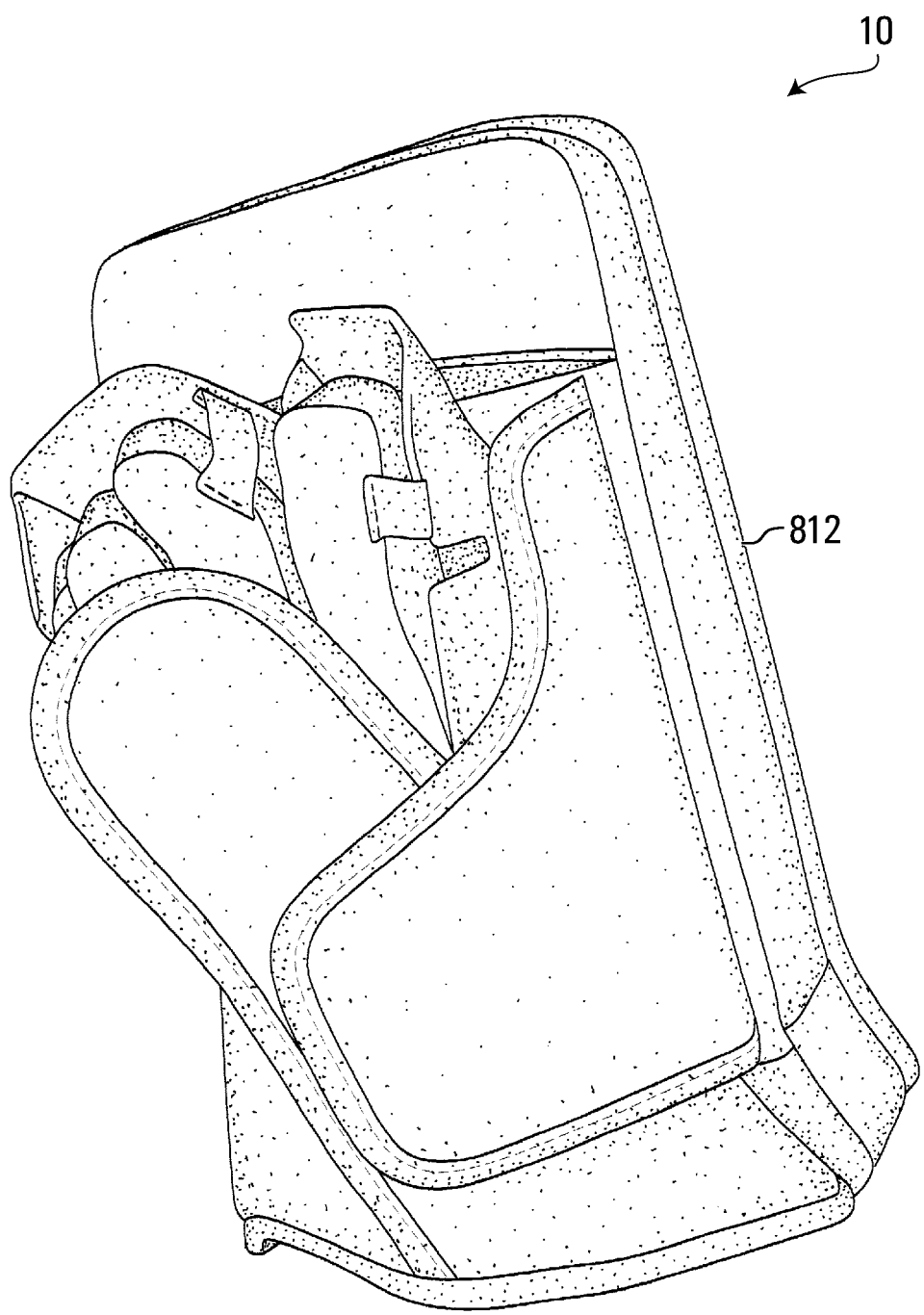
FIG. 33 shows an embodiment in which the post-molded expandable component is comprised by a blocker glove.
Figure 34:
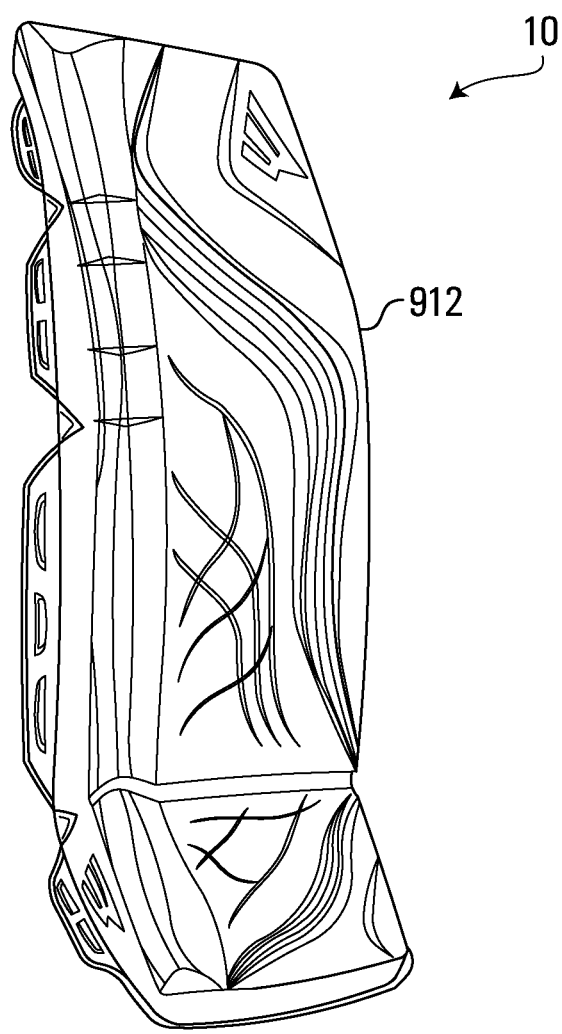
FIG. 34 shows an embodiment in which the post-molded expandable component is comprised by a hockey goalkeeper leg pad.

In some cases, with additional reference to FIGS. 32 to 34, the article of protective athletic gear 10 may be for a hockey goalie. For example, as shown in FIG. 32, the article of protective athletic gear 10 may be a chest protector for a goalie for protecting the goalie's torso and arms. The chest protector 10 comprises a post-molded expandable component 712 constructed using principles described herein in respect of the post-molded expandable components $12_1$-$12_E$. The post-molded expandable component 712 may constitute any portion of the chest protector 10 (e.g., a chest portion, an upper arm portion, a lower arm portion, an abdominal portion, etc.).

As another example, as shown in FIG. 33, the article of protective athletic gear 10 may be a blocker glove for a goalie for protecting the goalie's hand and deflecting a puck or ball. In this example, the blocker glove 10 comprises a post-molded expandable component 812 constructed using principles described herein in respect of the post-molded expandable components $12_1$-$12_E$. For example, the post-molded expandable component 812 may constitute a board portion of the blocker glove 10 which the goalie uses to deflect pucks or balls.

As yet another example, as shown in FIG. 34, the article of protective athletic gear 10 may be a leg pad for a goalie for protecting a leg and knee of the goalie. In this example, the leg pad 10 comprises a post-molded expandable component 912 constructed using principles described herein in respect of the post-molded expandable components $12_1$-$12_E$. For example, the post-molded expandable component 912 may constitute a padding portion of the leg pad 10 that is disposed underneath an outer cover of the leg pad 10. In other examples, the post-molded expandable component 912 may be an outermost layer of the leg pad 10 such that an object (e.g., a puck or ball) impact the leg pad 10 impacts the post-molded expandable component 912 directly.

In some embodiments, the article of athletic gear 10 may be used for purposes other than protection.

Figure 35:
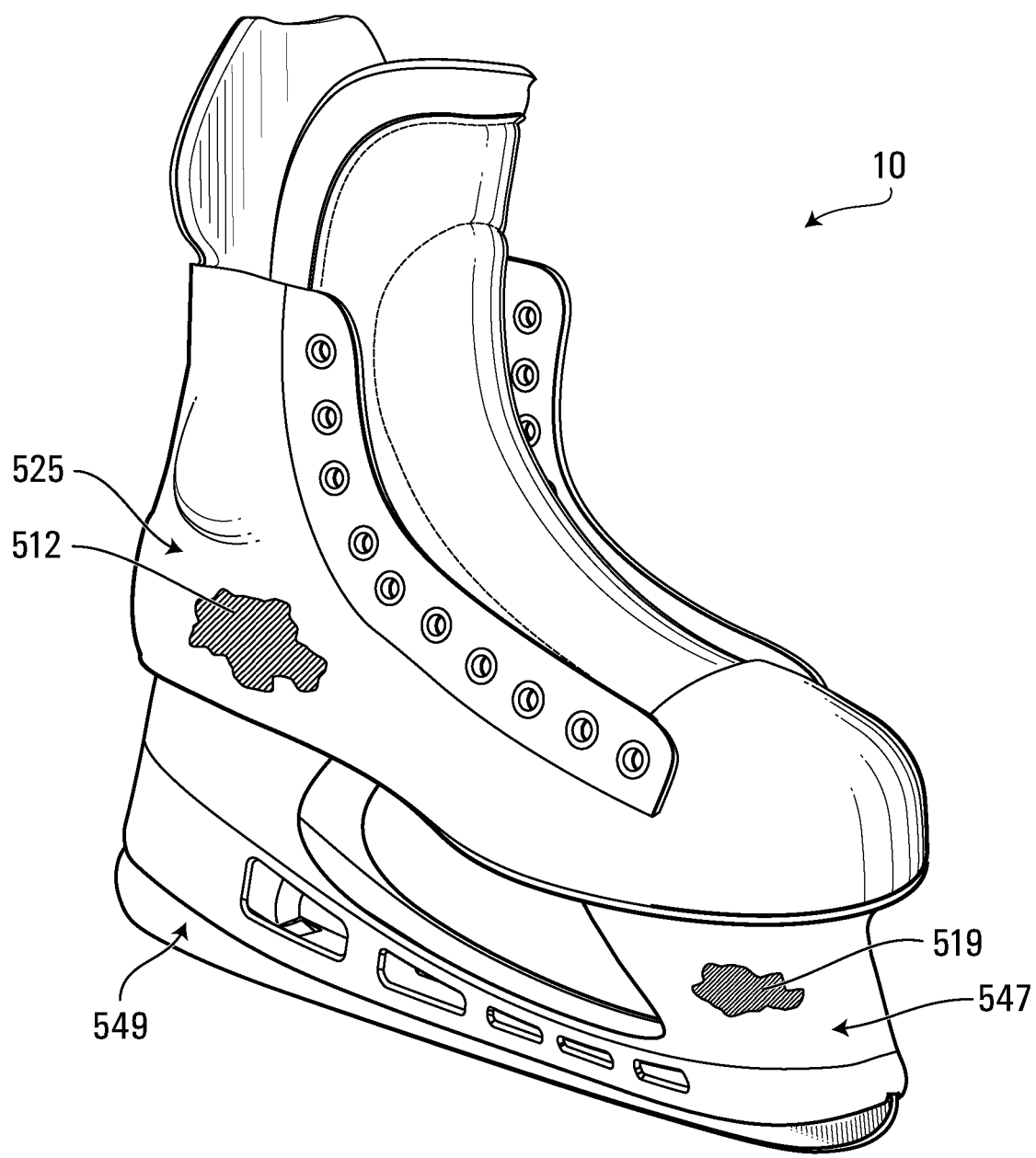
FIG. 35 shows an embodiment in which a skate comprises the post-molded expandable component.

For example, in some embodiments, as shown in FIG. 35, the article of athletic gear 10 may be a skate (e.g., an ice skate) for enabling a user to skate on a skating surface (e.g., ice), in which the skate 10 comprises a post-molded expandable component 512 constructed using principles described herein in respect of the post-molded expandable components $12_1$-$12_E$ and constituting at least part of a skate boot 525 of the skate 10 (e.g., at least part of an outer shell or an inner liner of the skate boot 525 of the skate 10). As another possibility, in some embodiments, the skate 10 may comprise a post-molded expandable component 519 constructed using principles described herein in respect of the post-molded expandable components $12_1$-$12_E$ and constituting at least part of a blade holder 547 of the skate 10 that holds a blade 549 of the skate.

Figure 36B:
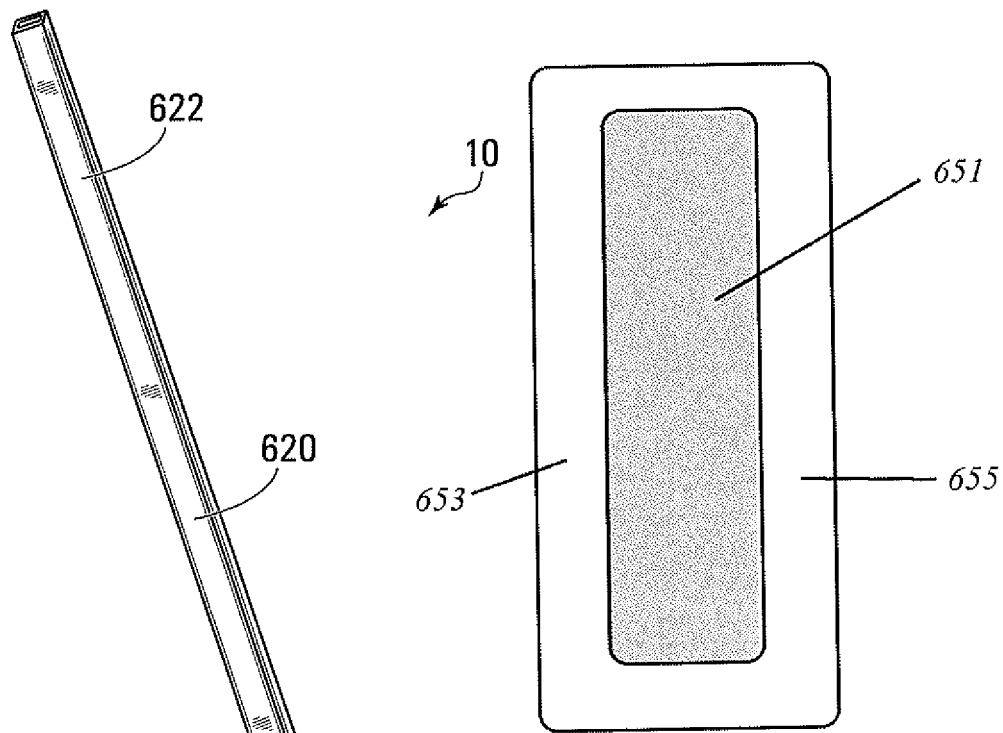
FIG. 36B shows a cross-section of a blade of the hockey stick of FIG. 36A.
Figure 36A:
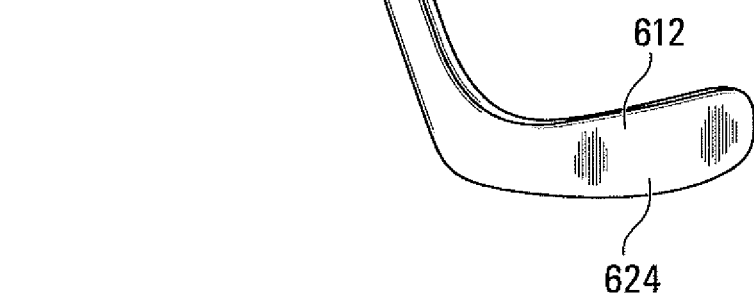
FIG. 36A shows an example of an embodiment in which the post-molded expandable component is comprised by a hockey stick.

As another example, in some embodiments, with additional reference to FIGS. 36A to 38, the article of athletic gear 10 may be a sports implement for handling by a user, in which the sports implement 10 comprises a post-molded expandable component 612 constructed using principles described herein in respect of the post-molded expandable components $12_1$-$12_E$. In this embodiment, as shown in FIG. 36, the sports implement 10 is a stick and more particularly a hockey stick. The hockey stick 10 comprises a shaft 620, a handle 622 disposed at a proximal end portion of the shaft 620, and a blade 624 disposed adjacent a distal end portion of the shaft 620. In this example, the blade 624 of the hockey stick 10 comprises the post-molded expandable component 612. For instance, in some embodiments, the post-molded expandable component 612 may constitute at least part of a core 651 of the blade 624 that is disposed internally of the blade 624 (i.e., between front and back walls 653, 655 of the blade 624 that may be made of composite material such as fiber-reinforced polymeric material).

Figure 37:
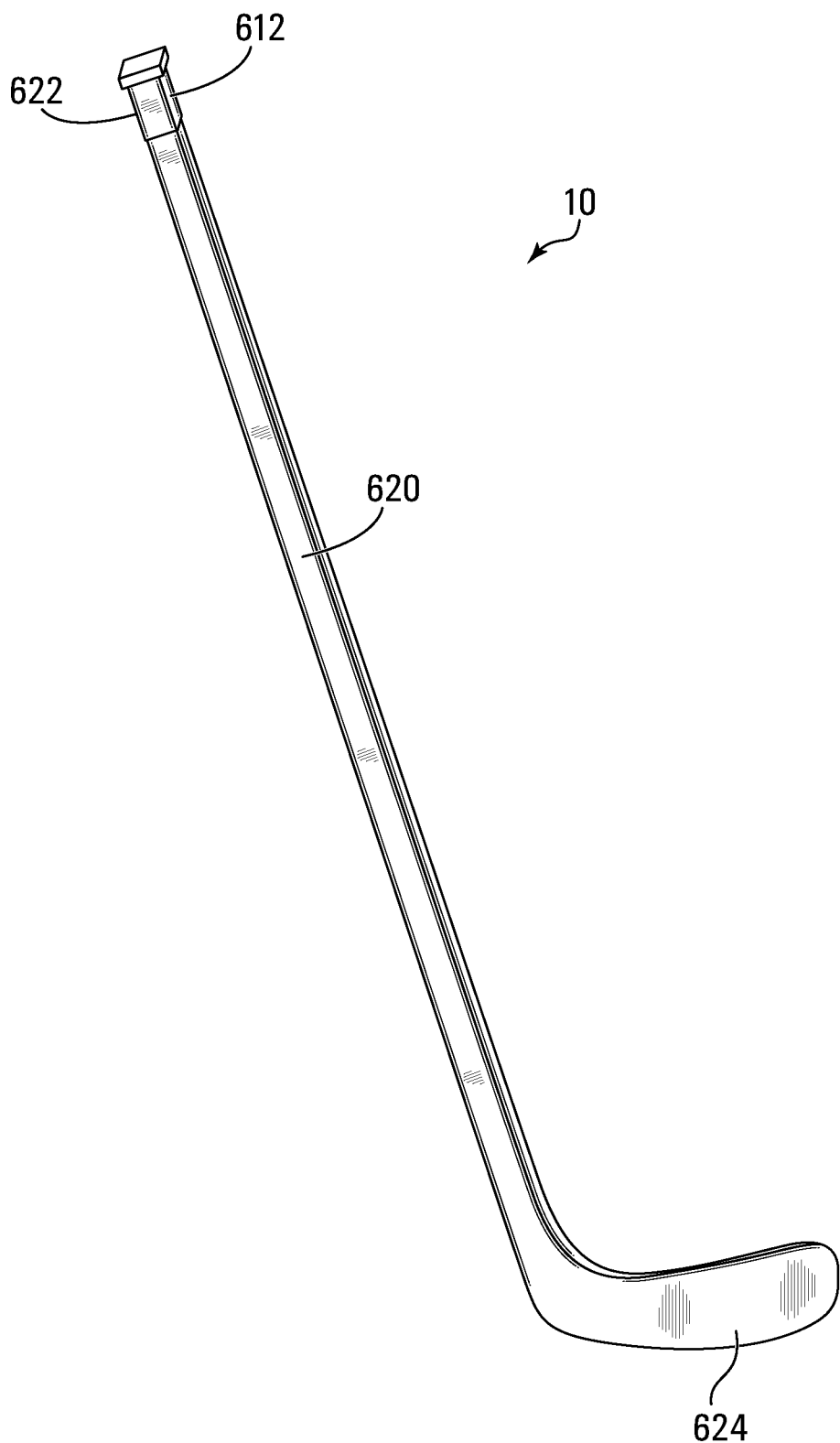
FIG. 37 shows another example of an embodiment in which the post-molded expandable component is comprised by a hockey stick.

In a variant, another part of the hockey stick 10 may comprise the post-molded expandable component 612. For instance, as shown in FIG. 37, in some examples, the handle 622 of the hockey stick 10 may comprise the post-molded expandable component 612 or another post-molded expandable component similar to the post-molded expandable component 612. As another example, in some cases, the blade 624 of the hockey stick 10 may comprise the post-molded expandable component 612 while the handle 622 of the hockey stick 10 may comprise another post-molded expandable component 612.

Figure 38:
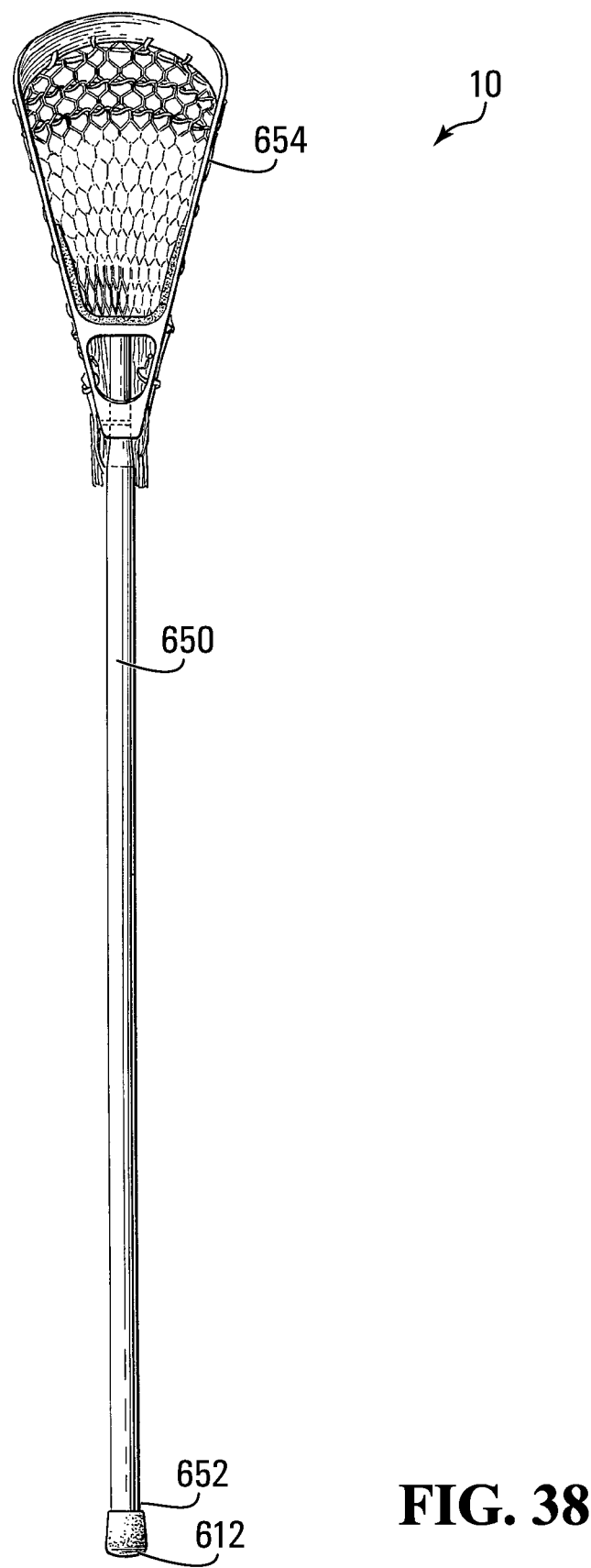
FIG. 38 shows an embodiment in which the post-molded expandable component is comprised by a lacrosse stick.

As another example, with additional reference to FIG. 38, the sports implement 10 may be a lacrosse stick. The lacrosse stick 10 comprises a shaft 650, a handle 652 disposed at a proximal end portion of the shaft 650, and a lacrosse head 654 disposed adjacent a distal end portion of the shaft 650. In this example, the handle 652 of the lacrosse stick 10 comprises the post-molded expandable component 612. In other examples, other parts of the lacrosse stick 10 may comprise the post-molded expandable component 612 or another post-molded expandable component 612 similar to the post-molded expandable component 612.

Figures 46A, 46B:
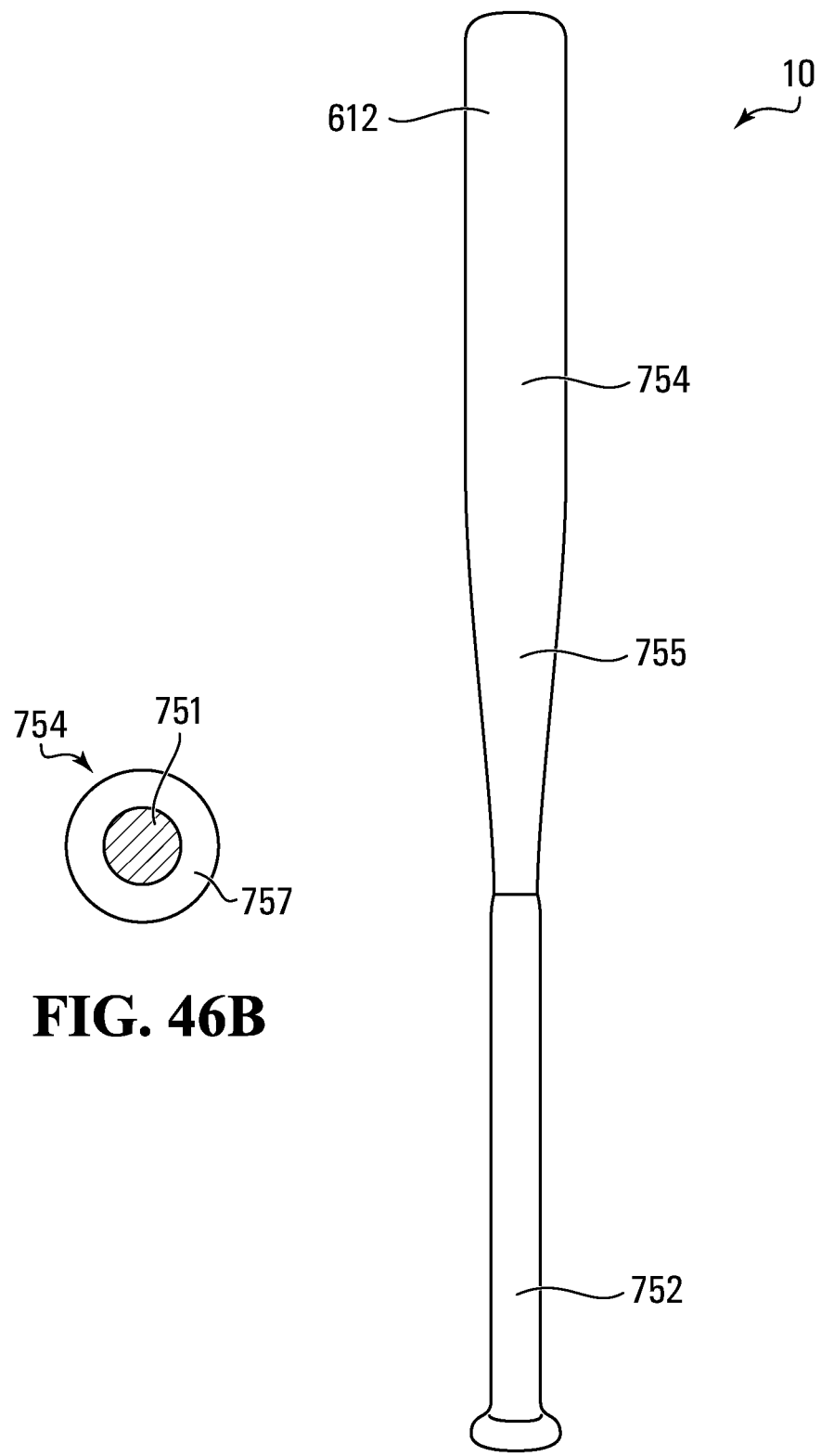
FIG. 46A shows an embodiment in which the post-molded expandable component is comprised by a ball bat.
FIG. 46B shows a cross-section of the ball bat of FIG. 46A.

As another example, with additional reference to FIGS. 46A and 46B, the sports implement 10 may be a ball bat, such as a baseball bat or a softball bat. The ball bat 10 comprises a handle 752, a barrel 754, and a tapered transition 755 between the handle 752 and the barrel 754. In this example, the barrel 754 comprises the post-molded expandable component 612. For instance, in some embodiments, the post-molded expandable component 612 may constitute at least part of a core 751 of the barrel 754 that is disposed internally of the barrel 754 (i.e., within a peripheral wall 757 of the barrel 754 that may be made of metallic material and/or composite material such as fiber-reinforced polymeric material). In other examples, other parts of the ball bat 10 may comprise the post-molded expandable component 612 or another post-molded expandable component 612 similar to the post-molded expandable component 612.

Although in embodiments considered above the article of athletic gear 10 is hockey lacrosse, or baseball/softball gear, in other embodiments, the article of athletic gear 10 may be any other article of athletic gear usable by a player playing another type of contact sport (e.g., a "full-contact" sport) in which there are significant impact forces on the player due to player-to-player and/or player-to-object contact or any other type of sports, including athletic activities other than contact sports. For example, in other embodiments, the article of athletic gear 10 may be an article of football gear for a football player, an article of soccer gear for a soccer player, etc.

In other embodiments, a device comprising one or more post-molded expandable components constructed using principles described herein in respect of the post-molded expandable components $12_1$-$12_E$ may be anything other than an article of athletic gear and may thus be designed for any suitable purpose. For example, this may include blunt trauma personal protective equipment (PPE), insulating components, surf boards, swimming boards, automotive bumpers, motocross gear, cushioning devices, etc.

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

Any feature of any embodiment discussed herein may be combined with any feature of any other embodiment discussed herein in some examples of implementation.

In case of any discrepancy, inconsistency, or other difference between terms used herein and terms used in any document incorporated by reference herein, meanings of the terms used herein are to prevail and be used.

Although various embodiments and examples have been presented, this was for the purpose of describing, but not limiting, the invention. Various modifications and enhancements will become apparent to those of ordinary skill in the art and are within the scope of the invention, which is defined by the appended claims.

The invention claimed is:

1. A helmet for protecting a head of a user, the helmet comprising:
    a shell comprising an outer surface of the helmet; and
    a liner disposed within the shell and comprising an inner surface of the helmet, the inner surface of the helmet being configured to contact the user's head, the liner including a pad comprising an expandable material formed into an initial three-dimensional configuration and subsequently expanded to an expanded three-dimensional configuration that is a scaled-up version of the initial three-dimensional configuration and is thicker than the shell in response to a stimulus after being formed into the initial three-dimensional configuration.

2. The helmet of claim 1, wherein the expandable material comprises a polymeric substance and an expansion agent.

3. The helmet of claim 2, wherein the expansion agent constitutes at least 10% of the expandable material by weight.

4. The helmet of claim 2, wherein the expansion agent constitutes at least 40% of the expandable material by weight.

5. The helmet of claim 2, wherein the expansion agent comprises expandable microspheres.

6. The helmet of claim 5, wherein the expandable microspheres constitute at least 10% of the expandable material by weight.

7. The helmet of claim 5, wherein the expandable microspheres constitute at least 20% of the expandable material by weight.

8. The helmet of claim 5, wherein the expandable microspheres constitute at least 40% of the expandable material by weight.

9. The helmet of claim 5, wherein the expandable microspheres include dry unexpanded microspheres.

10. The helmet of claim 2, wherein a density of the expandable material is no more than 70% of a density of the polymeric substance.

11. The helmet of claim 2, wherein a modulus of elasticity of the expandable material is different from a modulus of elasticity of the expansion agent.

12. The helmet of claim 11, wherein a difference between the modulus of elasticity of the expandable material and the modulus of elasticity of the expansion agent is at least 20% based on a smaller one of the modulus of elasticity of the expandable material and the modulus of elasticity of the expansion agent.

13. The helmet of claim 2, wherein a resilience of the expandable material is less than a resilience of the expansion agent according to ASTM D2632-01.

14. The helmet of claim 13, wherein the resilience of the expandable material is no more than 70% of the resilience of the expansion agent according to ASTM D2632-01.

15. The helmet of claim 2, wherein a resilience of the expandable material is no more than 40% according to ASTM D2632-01.

16. The helmet of claim 2, wherein a resilience of the expandable material is no more than 20% according to ASTM D2632-01.

17. The helmet of claim 2, wherein an elongation at break of the expandable material is at least 20%.

18. The helmet of claim 2, wherein the polymeric substance is elastomeric.

19. The helmet of claim 1, wherein an expansion ratio of the pad is at least 5.

20. The helmet of claim 1, wherein an expansion ratio of the pad is at least 10.

21. The helmet of claim 1, wherein an expansion ratio of the pad is at least 20.

22. The helmet of claim 1, wherein the stimulus is heat.

23. The helmet of claim 2, wherein a temperature of the expandable material while being formed into the initial three-dimensional configuration is lower than an expansion temperature of the expansion agent.

24. The helmet of claim 1, wherein the expandable material is formed into the initial three-dimensional configuration by being injection molded into the initial three-dimensional configuration.

25. The helmet of claim 1, wherein the stimulus is initiated a substantial amount of time after the expandable material is formed into the initial three-dimensional configuration.

26. The helmet of claim 25, wherein the substantial amount of time is at least one hour.

27. The helmet of claim 25, wherein the substantial amount of time is at least one day.

28. The helmet of claim 1, wherein the expandable material is formed into the initial three-dimensional configuration by being molded into the initial three-dimensional configuration in a mold and subsequently expanded to the expanded three-dimensional configuration in response to the stimulus upon removal from the mold.

29. The helmet of claim 1, wherein the stimulus is applied by heating the expandable material in an oven.

30. The helmet of claim 1, comprising an outer layer constituting at least part of an outer surface of the pad and colored differently than the expandable material.

31. The helmet of claim 30, wherein the outer layer is part of the pad before expansion of the expandable material into the expanded three-dimensional configuration and expanded with the expandable material when subjected to the stimulus after the expanded material is formed into the initial three-dimensional configuration.

32. The helmet of claim 1, wherein the pad comprises a plurality of regions that differ in stiffness and are at least partly made of the expandable material.

33. The helmet of claim 32, wherein: a first one of the regions of the pad is configured to be disposed closer to the user's head than a second one of the regions of the pad; and the second one of the regions of the pad is stiffer than the first one of the regions of the pad.

34. The helmet of claim 32, wherein: the expandable material is a first expandable material; the pad comprises a second expandable material different from the first expandable material; a first one of the regions of the pad is made of the first expandable material; and a second one of the regions of the pad is made of the second expandable material.

35. The helmet of claim 1, wherein the pad comprises a plurality of regions that differ in density and are at least partly made of the expandable material.

36. The helmet of claim 35, wherein: the expandable material is a first expandable material; the pad comprises a second expandable material different from the first expandable material; a first one of the regions of the pad is made of the first expandable material; and a second one of the regions of the pad is made of the second expandable material.

37. The helmet of claim 1, wherein: the expandable material is a first expandable material; and the pad comprises a second expandable material different from the first expandable material.

38. The helmet of claim 1, comprising an outer layer that constitutes at least part of an outer surface of the pad and is distinct from an underlying portion of the pad.

39. The helmet of claim 38, wherein the outer layer of the pad is colored differently than the underlying portion of the pad.

40. The helmet of claim 1, wherein the expandable material is shaped into a plurality of parts of the pad that are at least one of curved and angular and are present in the initial three-dimensional configuration and in the expanded three-dimensional configuration.

41. The helmet of claim 1, comprising a predetermined arrangement of shaped elements that are made of the expandable material, intersect one another, and are present in the initial three-dimensional configuration and in the expanded three-dimensional configuration.

42. The helmet of claim 41, wherein the shaped elements are regularly arranged.

43. The helmet of claim 41, wherein the shaped elements are relief elements of a texture of a surface of the component.

44. The helmet of claim 1, comprising empty spaces that are disposed between portions of the expandable material and are present in the initial three-dimensional configuration and in the expanded three-dimensional configuration.

45. The helmet of claim 1, wherein the expandable material is formed into the initial three-dimensional configuration using additive manufacturing.

46. The helmet of claim 45, wherein the expandable material formed into the initial three-dimensional configuration using additive manufacturing is formed into the initial three-dimensional configuration using selective laser sintering (SLS).

47. The helmet of claim 45, wherein the expandable material formed into the initial three-dimensional configuration using additive manufacturing is formed into the initial three-dimensional configuration using stereolithography (SLA).

48. The helmet of claim 45, wherein the expandable material formed into the initial three-dimensional configuration using additive manufacturing is molded into the initial three-dimensional configuration in a 3D-printed mold.

49. The helmet of claim 1, wherein a first one of the regions of the pad is configured to be disposed between the shell and a second one of the regions of the pad and is stiffer than the second one of the regions of the pad.

50. The helmet of claim 1, wherein: the pad is a first pad; and the liner includes a second pad distinct from the first pad.

51. The helmet of claim 50, wherein: the initial three-dimensional configuration is a first initial three-dimensional configuration; the expanded three-dimensional configuration is a first expanded three-dimensional configuration; the second pad comprises expandable material formed into a second initial three-dimensional configuration and subsequently expanded to a second expanded three-dimensional configuration that is a scaled-up version of the second initial three-dimensional configuration and is thicker than the shell; the second initial three-dimensional configuration is different from the first initial three-dimensional configuration; and the second expanded three-dimensional configuration is different from the second expanded three-dimensional configuration.

52. The helmet of claim 51, wherein the expanded material of the second pad is different from the expanded material of the first pad.

53. The helmet of claim 50, wherein the second pad is movable relative to the first pad.

54. The helmet of claim 53, wherein: the helmet comprises an adjustment mechanism configured to adjust a fit of the helmet on the user's head; and the second pad is movable relative to the first pad during operation of the adjustment mechanism.

55. The helmet of claim 50, wherein the liner comprises a gap between the first pad and the second pad.

56. The helmet of claim 50, wherein a curvature of an inner side of the first pad and a curvature of an inner side of the second pad form a continuity of one another.

57. The helmet of claim 1, wherein the liner comprises a plurality of shock absorbers that are spaced from one another and configured to deform when the helmet is impacted.

58. A helmet for protecting a head of a user, the helmet comprising:
a shell comprising an outer surface of the helmet; and
a liner disposed within the shell and comprising an inner surface of the helmet, the inner surface of the helmet being configured to contact the user's head, the liner including a plurality of pads distinct from one another, each of the pads comprising expandable material formed into an initial three-dimensional configuration and subsequently expanded to an expanded three-dimensional configuration that is a scaled-up version of the initial three-dimensional configuration, wherein the initial three-dimensional configuration of a first one of the pads is different from the initial three-dimensional configuration of a second one of the pads such that the expanded three-dimensional configuration of the first one of the pads is different from the expanded three-dimensional configuration of the second one of the pads.

59. An article of athletic gear wearable by a user, the article of athletic gear comprising:
a shell that is rigid and comprises an outer surface of the article of athletic gear; and
a liner that is disposed within the shell and comprises an inner surface of the article of athletic gear, the inner surface of the article of athletic gear being configured to contact the user, the liner including a pad comprising expandable material formed into an initial three-dimensional configuration and subsequently expanded to an expanded three-dimensional configuration that is a scaled-up version of the initial three-dimensional configuration and is thicker than the shell.

60. An article of athletic gear wearable by a user, the article of athletic gear comprising:
a shell that is rigid and comprises an outer surface of the article of athletic gear; and
a liner that is disposed within the shell and comprises an inner surface of the article of athletic gear, the inner surface of the article of athletic gear being configured to contact the user, the liner including a plurality of pads distinct from one another, each of the pads comprising expandable material formed into an initial three-dimensional configuration and subsequently expanded to an expanded three-dimensional configuration that is a scaled-up version of the initial three-dimensional configuration, wherein the initial three-dimensional configuration of a first one of the pads is different from the initial three-dimensional configuration of a second one of the pads such that the expanded three-dimensional configuration of the first one of the pads is different from the expanded three-dimensional configuration of the second one of the pads.

* * * * *